United States Patent
Hintzer et al.

(10) Patent No.: US 7,754,795 B2
(45) Date of Patent: Jul. 13, 2010

(54) COATING COMPOSITION

(75) Inventors: Klaus Hintzer, Kastl (DE); Michael Jürgens, Neuoetting (DE); Harald Kaspar, Burgkirchen (DE); Herbert Koenigsmann, Burgkirchen (DE); Kai Helmut Lochhaas, Neuoetting (DE); Andreas R. Maurer, Langenneufnach (DE); Werner Schwertfeger, Altoetting (DE); Tilman Zipplies, Burghausen (DE); Ludwig Mayer, Burgkirchen (DE); Michael C. Dadalas, Eggenfelden (DE); George G. I. Moore, Afton, MN (US); Jay F. Schulz, Inver Grove Heights, MN (US); Richard M. Flynn, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 825 days.

(21) Appl. No.: 11/420,431

(22) Filed: May 25, 2006

(65) Prior Publication Data

US 2007/0276068 A1    Nov. 29, 2007

(51) Int. Cl.
C08K 5/00 (2006.01)
(52) U.S. Cl. ............... 524/284; 524/502; 524/544; 524/545; 526/242; 526/248; 526/250
(58) Field of Classification Search ........... 524/284, 524/502, 544, 545; 526/242, 248, 250
See application file for complete search history.

(56) References Cited

U.S. PATENT DOCUMENTS

| | | | |
|---|---|---|---|
| 2,713,593 A | 7/1955 | Brice et al. | |
| 3,037,953 A | 6/1962 | Marks et al. | |
| 3,142,665 A | 7/1964 | Cardinal et al. | |
| 3,179,614 A | 4/1965 | Edwards | |
| 3,260,691 A | 7/1966 | Lavin et al. | |
| 3,271,341 A * | 9/1966 | Garrison, Jr. ............... 524/777 |
| 3,315,201 A | 4/1967 | Weme | |
| 3,345,317 A | 10/1967 | Hoashi | |
| 3,391,099 A | 7/1968 | Punderson | |
| 3,451,908 A | 6/1969 | Sianesi et al. | |
| 3,489,595 A | 1/1970 | Brown, Jr. | |
| 3,555,100 A | 1/1971 | Garth et al. | |
| 3,635,926 A | 1/1972 | Gresham | |
| 3,642,742 A | 2/1972 | Carlson | |
| 3,721,696 A | 3/1973 | Sianesi et al. | |
| 3,790,403 A | 2/1974 | Ribbans, III | |
| 3,855,191 A | 12/1974 | Doughty, Jr. et al. | |
| 3,882,153 A | 5/1975 | Seki et al. | |
| 3,981,945 A | 9/1976 | Attwood et al. | |
| 4,016,345 A | 4/1977 | Holmes | |
| 4,025,709 A | 5/1977 | Blaise et al. | |
| 4,049,863 A | 9/1977 | Vassiliou | |
| 4,123,401 A | 10/1978 | Berghmans et al. | |
| 4,131,711 A | 12/1978 | Attwood | |
| 4,252,859 A | 2/1981 | Concannon et al. | |
| 4,262,101 A | 4/1981 | Hartwimmer et al. | |
| 4,282,162 A | 8/1981 | Kuhls | |
| 4,287,112 A | 9/1981 | Berghmans | |
| 4,292,402 A | 9/1981 | Pollet et al. | |
| 4,342,825 A | 8/1982 | Van Poucke et al. | |
| 4,353,950 A | 10/1982 | Vassiliou | |
| 4,369,266 A | 1/1983 | Kuhls et al. | |
| 4,380,618 A | 4/1983 | Khan et al. | |
| 4,381,384 A | 4/1983 | Khan | |
| 4,391,940 A | 7/1983 | Kuhls et al. | |
| 4,425,448 A | 1/1984 | Concannon et al. | |
| 4,439,385 A | 3/1984 | Kuhls et al. | |
| 4,544,458 A | 10/1985 | Grot et al. | |
| 4,548,986 A | 10/1985 | Suzuki et al. | |
| 4,552,925 A | 11/1985 | Nakagawa et al. | |
| 4,588,796 A | 5/1986 | Wheland | |
| 4,618,641 A | 10/1986 | Hengel | |
| 4,621,116 A | 11/1986 | Morgan | |
| 4,623,487 A | 11/1986 | Cope | |

(Continued)

FOREIGN PATENT DOCUMENTS

CA    2354138    6/2000

(Continued)

OTHER PUBLICATIONS

"Guide to Protein Furification, Methods in Enzymology," Deutscher, M. vol. 182, 24. 1990. (pp. 309-317).

(Continued)

*Primary Examiner*—Peter D. Mulcahy
*Assistant Examiner*—Henry Hu
(74) *Attorney, Agent, or Firm*—Julie A. Lapos-Kuchar; Brian E. Szymanski

(57) ABSTRACT

A coating composition having (i) an aqueous dispersion of fluoropolymer particles comprising a non-melt processable polymer of tetrafluoroethylene, (ii) a fluorinated surfactant, (iii) a non-ionic non-fluorinated surfactant and (iv) a non-fluorinated polymer, wherein the fluorinated surfactant is selected from fluorinated carboxylic acids or salts thereof of the general formula (I):

$$[R_f\text{—O-L-COO}^-]_i X^{i+} \qquad (I)$$

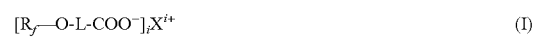

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3.

23 Claims, No Drawings

U.S. PATENT DOCUMENTS

| | | |
|---|---|---|
| 4,766,190 A | 8/1988 | Morita et al. |
| 4,789,717 A | 12/1988 | Giannetti et al. |
| 4,832,879 A | 5/1989 | Hamprecht |
| 4,861,845 A | 8/1989 | Slocum et al. |
| 4,864,006 A | 9/1989 | Giannetti et al. |
| 4,987,254 A | 1/1991 | Schwertfeger et al. |
| 5,075,397 A | 12/1991 | Tonelli et al. |
| 5,153,322 A | 10/1992 | Flynn |
| 5,160,791 A | 11/1992 | Tannenbaum |
| 5,168,107 A | 12/1992 | Tannenbaum |
| 5,182,342 A | 1/1993 | Feiring et al. |
| 5,198,491 A | 3/1993 | Honda et al. |
| 5,219,910 A | 6/1993 | Stahl et al. |
| 5,223,343 A | 6/1993 | Tannenbaum |
| 5,229,480 A | 7/1993 | Uschold |
| 5,230,961 A | 7/1993 | Tannenbaum |
| 5,272,186 A | 12/1993 | Jones |
| 5,285,002 A | 2/1994 | Grootaert |
| 5,312,935 A | 5/1994 | Mayer et al. |
| 5,442,097 A | 8/1995 | Obermeier et al. |
| 5,447,982 A | 9/1995 | Kamba et al. |
| 5,453,477 A | 9/1995 | Oxenrider et al. |
| 5,463,021 A | 10/1995 | Beyer et al. |
| 5,478,651 A | 12/1995 | Tannenbaum |
| 5,488,142 A | 1/1996 | Fall et al. |
| 5,498,680 A | 3/1996 | Abusleme et al. |
| 5,530,078 A | 6/1996 | Felix et al. |
| 5,532,310 A | 7/1996 | Grenfell et al. |
| 5,562,991 A | 10/1996 | Tannenbaum |
| 5,576,381 A | 11/1996 | Bladel et al. |
| 5,591,877 A | 1/1997 | Obermeier et al. |
| 5,608,022 A | 3/1997 | Nakayama et al. |
| 5,656,201 A | 8/1997 | Vicsa et al. |
| 5,663,255 A | 9/1997 | Anolick et al. |
| 5,667,846 A | 9/1997 | Thomas |
| 5,688,884 A | 11/1997 | Baker et al. |
| 5,700,859 A | 12/1997 | Ogura et al. |
| 5,710,345 A | 1/1998 | Navarrini et al. |
| 5,721,053 A | 2/1998 | Thomas |
| 5,763,552 A | 6/1998 | Feiring et al. |
| 5,789,083 A | 8/1998 | Thomas |
| 5,789,508 A | 8/1998 | Baker et al. |
| 5,804,650 A | 9/1998 | Tsuda et al. |
| 5,895,799 A | 4/1999 | Wu et al. |
| 5,955,556 A | 9/1999 | McCarthy et al. |
| 5,959,026 A | 9/1999 | Abusleme et al. |
| 5,969,063 A | 10/1999 | Parker et al. |
| 5,990,330 A | 11/1999 | Sulzbach et al. |
| 6,013,795 A | 1/2000 | Manzara et al. |
| 6,025,307 A | 2/2000 | Chittofrati et al. |
| 6,103,843 A | 8/2000 | Abusleme et al. |
| 6,103,844 A | 8/2000 | Brothers |
| 6,126,849 A | 10/2000 | Yamana et al. |
| 6,136,893 A | 10/2000 | Yamashita et al. |
| 6,153,688 A | 11/2000 | Miura et al. |
| 6,218,464 B1 | 4/2001 | Parker et al. |
| 6,245,923 B1 | 6/2001 | Sulzbach et al. |
| 6,255,384 B1 | 7/2001 | McCarthy et al. |
| 6,255,536 B1 | 7/2001 | Worm et al. |
| 6,267,865 B1 | 7/2001 | Polson et al. |
| 6,365,684 B1 | 4/2002 | McCarthy et al. |
| 6,391,182 B2 | 5/2002 | Smeltzer et al. |
| 6,395,848 B1 | 5/2002 | Morgan et al. |
| 6,410,626 B1 | 6/2002 | Wada et al. |
| 6,429,258 B1 | 8/2002 | Morgan et al. |
| 6,436,244 B1 | 8/2002 | Fuhrer et al. |
| 6,482,979 B1 | 11/2002 | Hintzer et al. |
| 6,512,063 B2 | 1/2003 | Tang |
| 6,518,442 B1 | 2/2003 | Felix et al. |
| 6,576,703 B2 | 6/2003 | Kapeliouchko et al. |
| 6,593,416 B2 | 7/2003 | Grootaert et al. |
| 6,602,968 B1 | 8/2003 | Bekiarian et al. |
| 6,610,788 B1 | 8/2003 | Takakura et al. |
| 6,613,941 B1 | 9/2003 | Felix et al. |
| 6,624,268 B1 | 9/2003 | Maekawa et al. |
| 6,632,508 B1 | 10/2003 | Pellerite et al. |
| 6,642,307 B1 | 11/2003 | Sogabe et al. |
| 6,642,415 B1 | 11/2003 | Fuhrer et al. |
| 6,660,798 B1 | 12/2003 | Marchese et al. |
| 6,677,414 B2 | 1/2004 | Hintzer et al. |
| 6,693,152 B2 | 2/2004 | Kaspar et al. |
| 6,703,520 B2 | 3/2004 | Hintzer et al. |
| 6,706,193 B1 | 3/2004 | Burkard et al. |
| 6,710,123 B1 | 3/2004 | Amin-Sanayei et al. |
| 6,737,489 B2 | 5/2004 | Linert et al. |
| 6,750,304 B2 | 6/2004 | Kaspar et al. |
| 6,761,964 B2 | 7/2004 | Tannenbaum |
| 6,774,164 B2 | 8/2004 | Lyons et al. |
| 6,794,550 B2 * | 9/2004 | Hintzer et al. ............... 570/178 |
| 6,815,040 B2 | 11/2004 | Pellerite et al. |
| 6,822,059 B2 | 11/2004 | Buckanin et al. |
| 6,825,250 B2 * | 11/2004 | Epsch et al. ................. 523/310 |
| 6,833,403 B1 * | 12/2004 | Bladel et al. ................. 524/458 |
| 6,846,570 B2 | 1/2005 | Leech et al. |
| 6,861,466 B2 * | 3/2005 | Dadalas et al. ............... 524/544 |
| 6,861,490 B2 | 3/2005 | Kaspar et al. |
| 6,869,997 B2 | 3/2005 | Wille et al. |
| 6,878,772 B2 | 4/2005 | Visca et al. |
| 6,956,078 B2 | 10/2005 | Cavanaugh et al. |
| 6,972,094 B2 | 12/2005 | Ichida et al. |
| 7,026,036 B2 | 4/2006 | Leech et al. |
| 7,041,728 B2 | 5/2006 | Zipplies et al. |
| 7,045,571 B2 | 5/2006 | Tan et al. |
| 7,064,170 B2 | 6/2006 | Kaspar et al. |
| 7,074,862 B2 | 7/2006 | Kaspar et al. |
| 7,122,608 B1 | 10/2006 | Brinati et al. |
| 7,125,941 B2 | 10/2006 | Kaulbach et al. |
| 7,126,016 B2 | 10/2006 | Fu et al. |
| 7,141,620 B2 | 11/2006 | Hoshikawa et al. |
| 7,462,667 B2 * | 12/2008 | Dadalas et al. ............... 524/544 |
| 2002/0198345 A1 | 12/2002 | Grootaert et al. |
| 2003/0125421 A1 | 7/2003 | Bladel et al. |
| 2003/0153674 A1 * | 8/2003 | Visca et al. .................. 524/801 |
| 2004/0010156 A1 | 1/2004 | Kondo et al. |
| 2004/0116742 A1 | 6/2004 | Guerra |
| 2004/0143052 A1 | 7/2004 | Epsch et al. |
| 2004/0186219 A1 | 9/2004 | Dadalas et al. |
| 2004/0242755 A1 | 12/2004 | Araki et al. |
| 2005/0043471 A1 | 2/2005 | Epsch et al. |
| 2005/0070633 A1 | 3/2005 | Epsch et al. |
| 2005/0090601 A1 | 4/2005 | Dadalas et al. |
| 2005/0090613 A1 | 4/2005 | Maruya et al. |
| 2005/0107506 A1 * | 5/2005 | Kapeliouchko et al. ...... 524/379 |
| 2005/0113519 A1 | 5/2005 | Buckanin et al. |
| 2005/0154104 A1 | 7/2005 | Malvasi et al. |
| 2005/0228127 A1 | 10/2005 | Tatemoto et al. |
| 2006/0003168 A1 | 1/2006 | Dadalas et al. |
| 2006/0041051 A1 | 2/2006 | Nakatani et al. |
| 2006/0160947 A1 | 7/2006 | Tan et al. |
| 2006/0281946 A1 | 12/2006 | Morita et al. |
| 2007/0015864 A1 | 1/2007 | Hintzer et al. |
| 2007/0025902 A1 | 2/2007 | Hintzer et al. |
| 2007/0082993 A1 | 4/2007 | Amin-Sanayei et al. |
| 2007/0117915 A1 | 5/2007 | Funaki et al. |
| 2007/0135558 A1 | 6/2007 | Tsuda et al. |
| 2007/0149733 A1 | 6/2007 | Otsuka et al. |
| 2007/0155891 A1 | 7/2007 | Tsuda et al. |

FOREIGN PATENT DOCUMENTS

| | | |
|---|---|---|
| DE | 3828063 | 2/1990 |
| DE | 19932771 | 1/2001 |
| DE | 19933696 | 1/2001 |
| DE | 10018853 | 10/2001 |

| | | |
|---|---|---|
| EP | 0014431 | 8/1980 |
| EP | 0015481 | 9/1980 |
| EP | 0022257 | 1/1981 |
| EP | 0222945 | 11/1984 |
| EP | 0219065 | 4/1987 |
| EP | 0524585 | 1/1993 |
| EP | 0525660 | 2/1993 |
| EP | 0612770 | 8/1994 |
| EP | 0625526 | 11/1994 |
| EP | 0632009 | 1/1995 |
| EP | 0649863 | 4/1995 |
| EP | 0712882 | 5/1996 |
| EP | 0718364 | 6/1996 |
| EP | 0739960 | 10/1996 |
| EP | 0752432 | 1/1997 |
| EP | 0816397 | 1/1998 |
| EP | 0818506 | 1/1998 |
| EP | 0890592 B1 | 1/1999 |
| EP | 0894541 | 2/1999 |
| EP | 0964009 | 12/1999 |
| EP | 0969027 | 1/2000 |
| EP | 1059333 | 12/2000 |
| EP | 1059342 | 12/2000 |
| EP | 1083441 | 3/2001 |
| EP | 1160258 | 12/2001 |
| EP | 1323677 | 7/2003 |
| EP | 1364972 | 11/2003 |
| EP | 1 334 996 | 3/2004 |
| EP | 1334996 A3 * | 3/2004 |
| EP | 1462461 | 9/2004 |
| EP | 1514848 | 4/2006 |
| GB | 642025 | 8/1950 |
| GB | 821353 | 10/1959 |
| GB | 966814 | 8/1964 |
| JP | 46011031 | 8/1966 |
| JP | 2000-128934 | 5/2000 |
| JP | 2002-179870 | 6/2002 |
| JP | 2002-308914 | 10/2002 |
| JP | 2002-317003 | 10/2002 |
| JP | 2003-043625 | 2/2003 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-0105045 | 4/2005 |
| RU | 2158274 | 10/2000 |
| WO | WO 94/14904 | 7/1994 |
| WO | WO96/24622 | 8/1996 |
| WO | WO 97/017381 | 5/1997 |
| WO | WO 98/50603 | 11/1998 |
| WO | WO 00/22002 | 4/2000 |
| WO | WO 00/35971 | 6/2000 |
| WO | WO 00/52060 | 9/2000 |
| WO | WO 00/71590 | 11/2000 |
| WO | WO 01/46116 | 6/2001 |
| WO | WO 01/79332 | 10/2001 |
| WO | WO 02/14223 | 2/2002 |
| WO | WO02/20676 | 3/2002 |
| WO | WO 02/078862 | 10/2002 |
| WO | WO 02/088203 | 11/2002 |
| WO | WO 02/088206 | 11/2002 |
| WO | WO 02/088207 | 11/2002 |
| WO | WO 02/095121 | 11/2002 |
| WO | WO 03/020836 | 3/2003 |
| WO | WO 03/051988 | 6/2003 |
| WO | WO 03/087176 | 10/2003 |
| WO | WO 03/087179 | 10/2003 |
| WO | WO 2004/031141 | 4/2004 |
| WO | WO 2004/067588 | 8/2004 |
| WO | WO 2005/003075 | 1/2005 |
| WO | WO2005/042593 | 5/2005 |
| WO | WO2005/056614 | 6/2005 |
| WO | WO2005/063827 | 7/2005 |
| WO | WO2005/065800 | 7/2005 |
| WO | WO 2005/082785 | 9/2005 |
| WO | WO2005/121290 | 12/2005 |
| WO | WO2006/011533 | 2/2006 |
| WO | WO2006/020721 | 2/2006 |
| WO | WO 2007/120348 | 10/2007 |

OTHER PUBLICATIONS

"High Performance Polymers for Diverse Applications," Modern Fluoropolymers. Edited by John Scheirs, John Wiley & Sons, 1997.
"Hydrogen-Ion Activity to Laminated Materials, Glass," Encyclopedia of Chemical Technology. John Wiley & Sons, vol. 13, 3$^{rd}$ Ed. 1981. (p. 687).
"Immorbilized Biocatalysts to Isoprene," Ullmann's Encyclopedia of Industrial Chemistry. vol. A14. 1985. (pp. 439-459).
"Identification to Lignin," Encyclopedia of Polymer Science and Engineering, John Wiley & Sons, vol. 8 1987 (p. 347).
"Nonionic Surfactants." Edited by Martin J. Schick. 1967, pp. 44-141, Marcel Dekker Inc., New York.
"Synthesis of Perfluoroalkyl Vinyl Ether Acids and Derivatives," Perfluoroalkyl Vinyl Ether Acids. Raymond Sullivan, vol. 34, No. 6, Jun. 1969. (p. 1841).
England, "Catalytic Conversion of Fluoroalkyl Alkyl Ethers to Carbonyl Compounds", J. Org. Chem., 1984, vol. 49, pp. 4007-4008.
Sudol et al., "Miniemulsion Polymerization", Emulsion Polymerization and Emulsion Polymers, John Wiley & Sons, 1997, Chapter. 20.
Candau, "Inverse Emulsion and Microemulsion Polymerization", Emulsion Polymerization and Emulusion Polymers, John Wiley & Sons, 1997, Chapter 21, pp. 723-741.
Chi et al., "A Facile Synthesis of Partly-fluorinated Eithers Using Perfluroporpoxyethylene and Aliphatic Alcohols", Bull. Korean Chem. Soc., 1999, vol. 20, No. 2, pp. 220-222.
Ebnesajjad, "Fluoroplastics, vol. 1, Non-Melt Processible Fluoroplastics", Plastics Design Library, NY, 2000, pp. 285-295.
Ebnesajjad, "Fluoroplastics, vol. 2, Melt Processible Fluoropolymers", Plastics Design Liberary, NY, 2003, pp. 1-21.
ASTM D 4895-04, "Standard Specification for Polytetrafluoroethylene (PTFE) Resin Produced From Dispersion", pp. 1-14, (2006).
Storsberg, Joachim and Ritter, Helmut, "Cyclodextrins in Polymer Synthesis: A 'Green' Route to Fluorinated Polymers via Cyclodextrin Complexes in Aqueous Solution", Macromol. Chem Phys., 2002, pp. 812-818.
Drobny, Technology of Fluoropolymers, CRC Press LLC, 2001, p. 35.
Kokelenberg, H. and Pollet, R., "A New type fluortensides, based on the addition of nucleophiles to chlorotrifluoroethylene and hexafluoropropylene." Tenside Detergents, 1985, 22(1), pp. 22-27.
Apostolo et al., "Microemulsion Polymerization for Producing Fluorinated Structured Materials", Macromol. Symp. 2004, 206, pp. 347-360.
Ivanova et al., "Synthesis of Alcohols from Perfluorvinyl Esters", Zh. Vses. Khim Obsh 1999, (24), pp. 656-657.
W.C. Griffin "Calculation of HLB Values of Non-Ionic Surfactants", Journal of Society of Cosmetic Chemists, vol. 5, (1954) p. 259.

* cited by examiner

COATING COMPOSITION

The present invention relates to coating compositions that comprise (i) non-melt processible polymer of tetrafluoroethylene and (ii) a fluorinated surfactant. The invention further relates to a method of coating a substrate, in particular a metal substrate with such coating composition. The invention also relates to a substrate obtainable with the method.

Polymers of tetrafluoroethylene (TFE) are well known for their superior heat resistance, chemical resistance, corrosion resistance and anti-stick properties. Because of these properties, polymers of TFE have found a wide range of applications including the use in so-called non-stick coatings on metal substrates such as cookware including cook, bake and frying articles.

Generally, these coating compositions also contain a non-fluorinated polymer to optimize one or more properties of the coating including for example, the adherence to the substrate, appearance of the coating, scratch resistance and/or toughness of the coating. Examples of such coating systems can be found in for example EP 894541, EP 1614731, WO 02/14065, U.S. Pat. No. 5,160,791; U.S. Pat. No. 5,230,961; U.S. Pat. No. 5,223,343; U.S. Pat. No. 5,168,107 and U.S. Pat. No. 5,168,013. Also, anti-stick coatings on substrates such as metal and glass typically comprise of two or more layers, although a single layer has been contemplated as well, whereby the nature and amount of the non-fluorinated polymer may be different from one layer to the other.

The polymer of TFE in the coating composition is typically an aqueous dispersion of the polymer. Generally, this aqueous dispersion is obtained by emulsion polymerization in the presence of a fluorinated surfactant. Frequently, the fluorinated surfactant is a perfluoroalkanoic acid or salt thereof as this surfactant provides excellent polymerization properties and results in dispersion with desired colloidal stability as well as shear stability, in particular when a non-ionic non-fluorinated surfactant is further added to the dispersion.

Unfortunately, perfluorinated alkanoic acids having 8 or more carbons are known to eliminate difficult from a living organism and thus they are bio-accumulating. Although it is known to reduce the amount of perfluorinated alkanoic acids and their salts in fluoropolymer dispersions by removing them from the dispersion, for example by contacting the dispersion with an anion exchange resin, there may still be residual perfluorinated alkanoic acid or salt thereof left in the dispersion. This is still undesirable, particular when the coating compositions in which the fluoropolymer dispersion is formulated, are used to coat cookware.

It would thus be desirable to find alternative fluorinated carboxylic acids that can be used in the emulsion polymerization of TFE as fluorinated surfactants and that preferably can be recovered from resulting aqueous dispersions using a convenient and cost effective method. Desirably, the alternative fluorinated carboxylic acids show lower bio-accumulation than perfluoro alkanoic acids having 8 or more carbon atoms, such that despite any remaining amount of the fluorinated carboxylic acid in the fluoropolymer dispersion, any coating composition formulated with the dispersion will have an improved environmental profile.

In accordance with the present invention, there is provided a coating composition comprising (i) an aqueous dispersion of fluoropolymer particles comprising a non-melt processible polymer of tetrafluoroethylene, (ii) a fluorinated surfactant, (iii) a non-ionic non-fluorinated surfactant and (iv) a non-fluorinated polymer, wherein said fluorinated surfactant is selected from fluorinated carboxylic acids or salts thereof of the general formula (I):

$$[R_f-O-L-COO^-]_i X^{i+} \quad (I)$$

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3.

It has been found that fluorinated carboxylic acids and salts according to the above general formula (I) eliminate more quickly from a living organism, in particular a rat, than perfluoro alkanoic acids having 8 or more carbon atoms. Additionally, it has been found that these surfactants can be used in the emulsion polymerization of TFE to produce aqueous dispersions of non-melt processible polymers of TFE. It has also been found that the resulting dispersions have good colloidal stability as well as good shear stability. Accordingly, it has been found that the resulting dispersion can be readily formulated to produce coating compositions for coating substrates, in particular metal substrates such as in coating of cookware. The resulting coatings generally have excellent anti-stick properties, adhere well to substrates and typically have desired scratch resistance and toughness.

In a further aspect, the present invention provides a method wherein a substrate is coated with the aforementioned coating composition. The invention in yet another aspect provides substrates that are coated with the aforementioned coating composition.

By the term 'non-melt processible' is meant that the melt viscosity of the homo- or copolymer of TFE is so high that conventional melt processing equipment cannot be used to process the TFE polymer. This means in general that the melt viscosity is at least $10^{10}$ Pa·s.

Fluorinated Carboxylic Acids

For the sake of convenience, the term 'fluorinated carboxylic acid' is hereinafter used to indicate the free acid as well as salts thereof. The fluorinated carboxylic acid used in the process of the invention corresponds to formula (I) above. Generally, the fluorinated carboxylic acid will be a low molecular weight compound, for example a compound having a molecular weight for the anion part of the compound of not more than 1000 g/mol, typically not more than 600 g/mol and in particular embodiments, the anion of the fluorinated carboxylic acid may have a molecular weight of not more than 500 g/mol.

Particularly preferred fluorinated carboxylic acids are those that when administered to rats show a recovery of at least 45%, for example at least 50% of the administered amount after 96 hours via renal elimination and that have a renal elimination half-life of not more than 35 hours, for example of not more than 30 hours in rats as tested according to the method set forth in the examples. Generally, fluorinated carboxylic acids in which each of the fluorinated aliphatic moieties in the compound have not more than 3 carbon atoms fulfill the aforementioned conditions of renal recovery and half-life. Thus, preferred compounds are those in which any fluorinated alkylene groups have not more than 3 carbon atoms and in which a fluorinated alkyl group of the compound has not more than 3 carbon atoms.

In the above formula (I), L represents a linking group. In one embodiment, the linking group can be a linear partially or fully fluorinated alkylene. Fully fluorinated alkylene groups include alkylene groups that consist of only carbon and fluorine atoms whereas partially fluorinated alkylene groups may additionally contain hydrogen. Generally, a partially fluorinated alkylene group should not contain more than 2 hydrogen atoms so as to be highly fluorinated and be non-telogenic or at least have minimal telogenic effects. Examples of fully fluorinated alkylene groups include linear perfluorinated alkylenes that have from 1 to 6 carbon atoms, for example linear perfluorinated alkylene groups of 1, 2, 3, 4 or 5 carbon atoms.

Examples of linear partially fluorinated alkylene groups include those that have from 1 to 6 carbon atoms. In a particular embodiment the linear partially fluorinated alkylene linking group has 1, 2, 3, 4, 5 or 6 carbon atoms and has only 1 or 2 hydrogen atoms. When the partially fluorinated alkylene group has 2 hydrogen atoms, they may be attached to the same carbon atom or they can be attached to different carbon atoms. When they are attached to different carbon atoms, such carbon atoms can be adjacent to each other or not. Also, in a particular embodiment, a carbon atom having 1 or 2 hydrogen atoms may be adjacent the ether oxygen atom to which the linking group is attached or adjacent the carboxylic group to which the linking group is attached at its other end.

In a further embodiment, the linking group L is an aliphatic hydrocarbon group. Examples of aliphatic hydrocarbon groups include linear, branched or cyclic aliphatic groups. Particular examples of aliphatic groups include linear or branched alkylene groups of 1 to 4 carbon atoms such as for example methylene or ethylene.

Particular examples of linking groups L may be selected from the following:

—$(CF_2)_g$— wherein g is 1, 2, 3, 4, 5 or 6;

—CFH—$(CF_2)_h$— wherein h is 0, 1, 2, 3, 4 or 5;

—$CF_2$—CFH—$(CF_2)_d$— wherein d is 0, 1, 2, 3 or 4;

—$CH_2$—$(CF_2)_h$— wherein h is 1, 2, 3 or 4;

—$(CH_2)_c$— wherein c is 1, 2, 3 or 4;

In the above examples, the left side of the formula of the linking group is the site where the linking group is connected to the ether oxygen in formula (I).

The $R_f$ group in formula (I) represents a linear partially or fully fluorinated aliphatic group or a linear partially or fully fluorinated aliphatic group interrupted with one or more oxygen atoms. In one embodiment, $R_f$ is a linear perfluorinated aliphatic group having 1 to 6 carbon atoms, preferably having 1, 2, 3 or 4 carbon atoms. According to another embodiment $R_f$ is a linear perfluorinated aliphatic group interrupted with one or more oxygen atoms of which the alkylene groups between oxygen atoms have not more than 4 or 6 carbon atoms, for example 3 or less carbon atoms and wherein the terminal alkyl group has not more than 4 or 6 carbon atoms, for example 3 or less carbon atoms. According to a still further embodiment, $R_f$ is a linear partially fluorinated aliphatic group having 1 to 6 carbon atoms and not more than 2 hydrogen atoms or a linear partially fluorinated aliphatic group interrupted with one or more oxygen atoms and which has not more than 2 hydrogen atoms. In the latter embodiment, it will generally be preferred that any perfluorinated alkylene moiety has not more than 4 or 6 carbon atoms and any terminal perfluorinated alkyl group, likewise preferably should not have more than 6 carbon atoms, for example not more than 4 carbon atoms. A particular example of a partially fluorinated aliphatic group $R_f$ is $CF_3CFH$—.

In a particular embodiment, $R_f$ may correspond to the following formula:

(II)

wherein $R_f^1$ is a perfluorinated linear aliphatic group of 1 to 6 carbon atoms (for example 3 or less), $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1.

In another embodiment, $R_f$ may correspond to the following formula:

(III)

wherein t is 0 or 1 and $R_f^7$ represents a linear partially or fully fluorinated aliphatic group optionally interrupted with one or more oxygen atoms. Typically $R_f^7$ does not contain perfluorinated aliphatic moieties of more than 4 or 6 carbon atoms. For example, in one embodiment, $R_f^7$ is a perfluorinated linear aliphatic group of 1 to 6 carbon atoms. In another embodiment, $R_f^7$ is a group corresponding to above formula (II).

In yet a further embodiment, $R_f$ may correspond to the following formula:

(IV)

wherein a is an integer of 1 to 6 and $R_f^8$ is a linear partially fluorinated aliphatic group or a linear fully fluorinated aliphatic group having 1, 2, 3 or 4 carbon atoms. When $R_f^8$ is a partially fluorinated aliphatic group, the number of carbon atoms preferably is between 1 and 6 and the number of hydrogen atoms in the partially fluorinated aliphatic groups is preferably 1 or 2.

In a still further embodiment, $R_f$ may correspond to the following formula:

(V)

wherein b is an integer of 1 to 6, preferably 1, 2, 3 or 4 and $R_f^9$ is a linear partially fluorinated aliphatic group or a linear fully fluorinated aliphatic group having 1, 2, 3 or 4 carbon atoms. When $R_f^9$ is a partially fluorinated aliphatic group, the number of carbon atoms preferably is between 1 and 6 and the number of hydrogen atoms in the partially fluorinated groups is preferably 1 or 2.

In a particular embodiment of the present invention, the fluorinated carboxylic acid corresponds to the following formula:

(VI)

wherein $R_f^a$ represents a linear partially or fully fluorinated aliphatic group optionally interrupted with one or more oxygen atoms, t is 0 or 1 and n is 0 or 1, $X^{i+}$ represents a cation having a valence i and i is 1, 2 or 3, with the proviso that when t is 0, the $R_f^a$ contains at least one ether oxygen atom.

In a particular aspect of this embodiment, the $R_f^a$ is selected from the group consisting of linear perfluorinated aliphatic groups of 1 to 6 carbon atoms, preferably having 1 to 4 carbon atoms, perfluorinated groups of the formula $R_f^1$—$[OR_f^2]_p$—$[OR_f^3]_q$— wherein $R_f^1$ is a linear perfluorinated aliphatic group of 1 to 6 carbon atoms, preferably 1 to 4 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R_f^4$—$[OR_f^5]_k$—$[OR_f^6]_m$—O—$CF_2$— wherein $R_f^4$ is a linear perfluorinated aliphatic group of 1 to 6 carbon atoms, preferably 1 to 4 carbon atoms, $R_f^5$ and $R_f^6$ each independently represents a linear perfluorinated alkylene of 1, 2, 3 or 4 carbon atoms and k and m each independently represent a value of 0 to 4.

Fluorinated carboxylic acid of formula (VI) can be derived from fluorinated olefins of the general formula:

$$R^a_f\text{—}(O)_t\text{—}CF\text{=}CF_2 \tag{VIa}$$

wherein $R^a_f$ and t are as defined above. Compounds according to formula (VIa) are well known in the art and include fluorinated olefins such as perfluorinated alkyl vinyl compounds, vinyl ethers in particular perfluorovinyl ethers and allyl ethers, in particular perfluorinated allyl ethers.

Fluorinated carboxylic acids according to formula (VI) wherein n is 0 can be prepared by reacting a fluorinated olefin of formula (VIa) with a base. The reaction is generally carried out in aqueous media. An organic solvent may be added to improve the solubility of the fluorinated olefin. Examples of organic solvents include glyme, tetrahydrofuran (THF) and acetonitrile. Additionally or alternatively a phase transfer catalyst may be used. As a base, use can be made of for example ammonia, alkali and earth alkali hydroxides. Without intending to be bound by any theory, it is believed, that the reaction proceeds according to the following sequence when ammonia is used as a base:

$$R_f\text{—}(O)_t\text{—}CF\text{=}CF_2+NH_3+H_2O\rightarrow R_f\text{—}(O)_t\text{—}CHF\text{—}COONH_4+NH_4F$$

The reaction is generally carried out between 0 and 200° C., for example between 20-150° C. and at a pressure between about 1 bar up to about 20 bar. For further purification, the obtained salts can be distilled via the free acid or by first converting the acid into an ester derivative and then distilling the ester derivative followed by hydolysis of the ester to obtain the purified acid or salt thereof.

Fluorinated carboxylic acids of formula (VI) wherein n is 0 can also be prepared by reacting a fluorinated olefin of formula (VIa) with a hydrocarbon alcohol in an alkaline medium and then decomposing the resulting ether in acidic conditions thereby forming the corresponding carboxylic acid. Suitable hydrocarbon alcohols include aliphatic alcohols such as lower alkanols having 1 to 4 carbon atoms. Specific examples include methanol, ethanol and butanol including t-butanol. The reaction of the fluorinated olefin with the alcohol in an alkaline medium may be carried out as described in "Furin et al., Bull Korean Chem. Soc. 20, 220 (1999)". The reaction product of this reaction is an ether derivative of the fluorinated olefin. This resulting ether can be decomposed under acidic conditions as described in "D. C. England, J. Org. Chem. 49, 4007 (1984)" to yield the corresponding carboxylic acid or salt thereof.

To prepare fluorinated carboxylic acids of formula (VI) wherein n is 1, a free radical reaction of the fluorinated olefin of formula (VIa) with methanol may be carried out followed by an oxidation of the resulting reaction product. The free radical reaction is typically carried out using a free radical initiator as is typically used in a free radical polymerization reaction. Examples of suitable free radical initiators include persulfates such as for example ammonium persulfate. Detailed conditions of the free radical reaction of the fluorinated carboxylic acid with an alcohol can be found in "S. V. Sokolov et al., Zh. Vses. Khim Obsh 24, 656 (1979)". The resulting alcohol derivative of the fluorinated olefin can be chemically oxidized with an oxidizing agent to the corresponding carboxylic acid. Examples of oxidizing agents include for example potassium permanganate, chromium (VI) oxide, $RuO_4$ or $OsO_4$ optionally in the presence of NaOCl, nitric acid/iron catalyst, dinitrogen tetroxide. Typically the oxidation is carried out in acidic or basic conditions at a temperature between 10 and 100° C. In addition to chemical oxidation, electrochemical oxidation may be used as well.

In another embodiment, the fluorinated carboxylic acid corresponds to the following formula:

$$R^b_f\text{—}(O)_t\text{—}CFH\text{—}CF_2\text{—}O\text{—}R\text{-}G \tag{VII}$$

wherein $R^b_f$ represents a linear partially or fully fluorinated aliphatic group optionally interrupted with one or more oxygen atoms, R is an aliphatic hydrocarbon group, G represents a carboxylic acid or salt thereof, t is 0 or 1. Particular examples for R include a methylene group or an ethylene group.

In a particular aspect of this embodiment, the $R^b_f$ is selected from the group consisting of linear perfluorinated aliphatic groups of 1 to 6 carbon atoms, preferably having 1 to 4 carbon atoms, perfluorinated groups of the formula $R^1_f\text{—}[OR^2_f]_p\text{—}[OR^3_f]_q\text{—}$ wherein $R^1_f$ is a linear perfluorinated aliphatic group of 1 to 6 carbon atoms, preferably 1 to 4 carbon atoms, $R^2_f$ and $R^3_f$ each independently represents a linear perfluorinated alkylene of 1, 2, 3 or 4 carbon atoms and p and q each independently represent a value of 0 to 4 and wherein the sum of p and q is at least 1 and perfluorinated groups of the formula $R^4_f\text{—}[OR^5_f]_k\text{—}[OR^6_f]_m\text{—}O\text{—}CF_2\text{—}$ wherein $R^4_f$ is a linear perfluorinated aliphatic group of 1 to 6 carbon atoms, preferably 1 to 4 carbon atoms, $R^5_f$ and $R^6_f$ each independently represents a linear perfluorinated alkylene of 1, 2, 3 or 4 carbon atoms and k and m each independently represent a value of 0 to 4.

Fluorinated carboxylic acids according to formula (VII) may be prepared through the preparation of an intermediate of formula (VIIa):

$$R^b_f\text{—}(O)_t\text{—}CFH\text{—}CF_2\text{—}O\text{—}R\text{—}Z$$

wherein $R^b_f$, t and R have the same meaning as defined above. Z represents a carboxylic acid ester or a carboxylamide.

The intermediate compound according to formula (VIIa) can be prepared by reacting a fluorinated olefin of the general formula (VIa) with an organic compound of the formula $$HO\text{—}R\text{—}Z \tag{VIIb}$$

wherein Z and R are as defined above. Compounds according to formula (VIIb) are well known in the art and/or are commercially available. The reaction of compound (VIa) with compound (VIIb) is typically carried out in the presence of a base although it is also possible to carry out the reaction under acidic or neutral conditions. Suitable bases include carbonates such as potassium carbonate, sodium carbonate and lithium carbonate, hydroxides, alkoholates etc. The amount of base used may vary widely. For example a catalytic amount may be used. Generally the amount of base used will be about at least 1 or 2% by weight based on the amount of reactant of formula (VIIb). In a particular embodiment, the amount of base can be up to 2 times the molar amount of the reactant of formula (VIIb). The reaction is typically carried out in an aprotic solvent such as for example, tetrahydrofuran, acetonitrile, glyme, diglyme etc. Further suitable aprotic solvents are disclosed in DE 3828063. The reaction is typically carried out a temperature between 0 and 200° C., for example between 10 and 150° C. The reaction is generally carried out at an ambient pressure (1 bar) or up to 20 bar. Following the reaction, the resulting compound may be isolated and purified by distillation.

The fluorinated carboxylic acids of formula (VII) can be readily prepared by hydrolyzing the intermediate compound of formula (VIIa) above. In formula (VIIa) above, Z represents a carboxylic acid ester or a carboxylamide. Typically a carboxylic acid ester is used. In one embodiment, the ester can be an aliphatic ester, e.g. an alkyl ester in which the number of carbon atoms in the alkyl group are from 1 to 4. Hydrolysis of the intermediate compound may be carried out under acidic or basic conditions and is generally carried out in an alcoholic acidic or basic solution of the intermediate compound. Alternatively the intermediate compound may be hydrolysed in an acidic or basic solution of other water miscible organic solvents such as ketones, ethers etc. Typically, a basic alcoholic solution is used such as for example a methanol or ethanol solution containing an alkali metal hydroxide as the base. Typically the hydrolysis is carried out at room temperature but it is also possible to use elevated temperatures of for example up to the boiling point of the solution.

Alternatively, the fluorinated surfactant may be prepared by reacting the fluorinated olefin of formula (VIa) above with a hydroxy substituted carboxylic acid or salt thereof. Thus, in accordance with this embodiment the fluorinated olefin of formula (VIa) is reacted with a compound of the formula:

$$HO-R-G \quad (VIIc)$$

wherein G is a carboxylic acid group or salt thereof and R is as defined above. The reaction of a fluorinated olefin of formula (VIa) with a hydroxy compound or formula (VIIc) can be carried out under the same conditions described above for the reaction with compounds of formula (VIIb).

In a still further embodiment, the fluorinated carboxylic acid corresponds to one of the following formulas:

$$R_f^c-(OCF_2)_u-O-(CF_2)_v-AC \quad (VIII)$$

wherein u is an integer of 1 to 6, v is an integer of 1 to 6, $R_f^c$ represents a linear perfluorinated aliphatic group of 1, 2, 3 or 4 carbon atoms and AC represents a carboxylic acid group or salt thereof; and $$R_f^c-O-(CF_2)_y-O-L^1-AC \quad (IX)$$

wherein y has a value of 1, 2, 3, 4, 5 or 6, $L^1$ represents a linear perfluorinated alkylene of 1, 2, 3, 4, 5 or 6 carbon atoms or a linear partially fluorinated alkylene having 1 to 6 carbon atoms and 1 or 2 hydrogen atoms, $R_f^c$ is as defined in above formula (VIII) and AC represents a carboxylic acid group or salt thereof. A particular example for $L^1$ includes a group of the formula —CFH—. Particular compounds according to formula (IX) include those wherein $R_f^c$ represents $CF_3CFH$—. Such groups can be obtained from decarboxylation of —$CF(CF_3)COOX$ groups (X is a cation) in the presence of a protic substance as described in JOC 34, 1841 (1969).

Fluorinated carboxylic acids of formula (VIII) are commercially available from Anles Ltd., St. Petersburg, Russia. These compounds may be prepared for example as described by Ershov and Popova in Fluorine Notes 4(11), 2002. Also, these fluorinated carboxylic acids typically form as byproducts in the manufacturing of hexafluoropropylene oxide by direct oxidation of hexafluoropropylene.

Fluorinated carboxylic acids according to formula (IX) can be derived from reactants that are also used in the manufacturing of fluorinated vinyl ethers as described in U.S. Pat. No. 6,255,536.

In another embodiment acid fluorides of formula (X) are reacted with a metal fluoride like KF or CsF:

$$R_f^g-COF \quad (X)$$

wherein $R_f^g$ is a partially or perfluorinated linear aliphatic chain optionally interrupted with one or more oxygen atoms. This reaction results in an alkoxylate that can be further reacted with a carboxylic acid derivative of formula (XI)

$$Y-(CH_2)_n-Q \quad (XI)$$

wherein Y represents a leaving group like iodide, bromide, chloride, mesylate, tosylate and the like, n is an integer from 1 to 3, and Q represents a carboxyl acid group or a lower alkyl ester. The reaction results in fluorinated carboxylic acid derivatives of formula (XII)

$$R_f^g-CF_2-O-(CH_2)_nQ \quad (XII)$$

with $R_f^g$ n, and Q having the same meaning as above. The corresponding salts can be obtained by saponification.

In yet a further embodiment the fluorinated carboxylic acids correspond to formula (XIII)

$$CF_3-CF_2-O-R_f^h-COOX \quad (XIII)$$

with $R_f^h$ representing a linear partially or fully fluorinated linear carbon chain of 1 to 8 carbon atoms optionally interrupted with one or more oxygen atoms, for example a perfluorinated linear aliphatic group of 1 to 6 carbon atoms, for example 1, 2, 3 or 4 carbon atoms and X is a monovalent cation. Compounds of this formula can be made by conversion of diacid difluorides of formula (XIV) in the presence of e.g. antimony pentafluoride.

$$FOC-CF(CF_3)-O-R_f^h-COF \quad (XIV)$$

This conversion may be carried out at elevated temperature according to the method described in U.S. Pat. No. 3,555,100 resulting preferably in the decarbonylation of the secondary COF group. The resulting mono acid fluoride can be converted to the corresponding salt using well known methods.

Fluorinated carboxylic acids having a —O—$CF_2$—COOX group can be obtained from the corresponding vinyl ethers —O—CF=$CF_2$. Reaction of the vinyl ether with oxygen according to U.S. Pat. No. 4,987,254 results in acid fluorides carrying a —O—$CF_2COF$ group which can be readily converted to the corresponding acid or salt.

Specific examples of compounds according to formula (I) include the following:

$R_f$—O—CHF—COOH $C_3F_7$—O—CHF—COOH $CF_3$—O—$CF_2CF_2$—$CF_2$—O—CHF—COOH $CF_3CF_2CF_2$—O—$CF_2CF_2$—$CF_2$—O—CHF—COOH $CF_3$—O—$CF_2$—$CF_2$—O—CHF—COOH $CF_3$—O—$CF_2$—O—$CF_2$—$CF_2$—O—CHF—COOH $CF_3$—(O—$CF_2$)$_2$—O—$CF_2$—$CF_2$—O—CHF—COOH $CF_3$—(O—$CF_2$)$_3$—O—$CF_2$—$CF_2$—O—CHF—COOH $R_f$—O—CHF—$CF_2$—COOH $CF_3$—O—CHF—$CF_2$—COOH $CF_3$—O—$CF_2$—$CF_2$—O—CHF—$CF_2$—COOH $CF_3$—$CF_2$—O—CHF—$CF_2$—COOH $CF_3$—O—$CF_2$—$CF_2$—$CF_2$—O—CHF—$CF_2$—COOH $CF_3$—O—$CF_2$—O—$CF_2$—$CF_2$—O—CHF—$CF_2$—COOH $CF_3$—(O—$CF_2$)$_2$—O—$CF_2$—$CF_2$—O—CHF—$CF_2$—COOH $CF_3$—(O—$CF_2$)$_3$—O—$CF_2$—$CF_2$—O—CHF—$CF_2$—COOH $R_f$—O—$CF_2$—CHFCOOH $CF_3$—O—$CF_2$—CHF—COOH $C_3F_7$—O—$CF_2$—CHF—COOH $CF_3$—O—$CF_2$—$CF_2$—$CF_2$—O—$CF_2$—CHF—COOH $CF_3$—O—$CF_2$—O—$CF_2$—$CF_2$—O—$CF_2$—CHF—COOH $CF_3$—(O—$CF_2$)$_2$—O—$CF_2$—$CF_2$—O—$CF_2$—CHF—COOH $CF_3$—(O—$CF_2$)$_3$—O—$CF_2$—$CF_2$—O—$CF_2$—CHF—COOH $R_f$—O—$CF_2$—CHF—$CF_2$COOH $CF_3$—O—$CF_2$—CHF—$CF_2$—COOH $C_2F_5$—O—$CF_2$—CHF—$CF_2$—COOH $C_3F_7$—O—$CF_2$—CHF—$CF_2$—COOH $CF_3$—O—$CF_2$—$CF_2$—$CF_2$—O—$CF_2$—CHF—$CF_2$—COOH $CF_3$—O—$CF_2$—O—$CF_2$—$CF_2$—O—$CF_2$—CHF—$CF_2$—COOH $CF_3$—(O—$CF_2$)$_2$—O—$CF_2$—$CF_2$—O—$CF_2$—CHF—$CF_2$—COOH $CF_3$—(O—$CF_2$)$_3$—O—$CF_2$—$CF_2$—O—$CF_2$—CHF—$CF_2$—COOH $R_f$—(O)$_m$—CHF—$CF_2$—O—$(CH_2)_n$—COOH n=1, 2 or 3; m=0 or 1

$CF_3$—O—CHF—$CF_2$—O—$CH_2$—COOH $CF_3$—O—$CF_2$—$CF_2$—$CF_2$—O—CHF—$CF_2$—O—$CH_2$—COOH $C_3F_7$—O—CHF—$CF_2$—O—$CH_2$—COOH $C_3F_7$—O—CHF—$CF_2$—O—$CH_2$—$CH_2$—COOH $C_3F_7$—O—$CF_2$—$CF_2$—O—CHF—$CF_2$—$OCH_2$COOH $C_3F_7$—O—$CF_2$—$CF_2$—$CF_2$—O—CHF—$CF_2$—$OCH_2$COOH $C_3F_7$—O—$CF_2$—CHF—$CF_2$—$OCH_2$COOH $CF_3$—CHF—$CF_2$—O—$CH_2$COOH $C_3F_7$—$CF_2$—CHF—$CF_2$—$OCH_2$—COOH $CF_3$—O—$CF_2$—$CF_2$—O—$CH_2$—COOH $CF_3$—O—$CF_2$—$CF_2$—$CF_2$—O—$CF_2$—$CF_2$—O—$CH_2$—COOH $C_3F_7$—O—$CF_2$—$CF_2$—O—$CH_2$—COOH $C_3F_7$—O—$CF_2$—$CF_2$—O—$CH_2$—$CH_2$—COOH $C_3F_7$—O—$CF_2$—$CF_2$—O—$CF_2$—$CF_2$—$OCH_2$COOH $C_3F_7$—O—$CF_2$—$CF_2$—$CF_2$—O—$CF_2$—$CF_2$—$OCH_2$COOH $C_3F_7$—O—$CF_2$—$CF_2$—$CF_2$—$OCH_2$COOH $C_4F_9$—O—$CH_2$—COOH $C_4F_9$—O—$CH_2$—$CH_2$—COOH $C_3F_7$—O—$CH_2$COOH $C_6F_{13}$—$OCH_2$—COOH $R_f$—O—$CF_2$—$CF_2$—COOH $CF_3$—O—$CF_2$—$CF_2$—COOH $C_2F_5$—O—$CF_2$—$CF_2$—COOH $C_3F_7$—O—$CF_2$—$CF_2$—COOH $C_4F_9$—O—$CF_2$—$CF_2$—COOH $R_f$—(O—$CF_2$)$_u$—O—$CF_2$—COOH with u being as defined above $CF_3$—(O—$CF_2$)$_3$—O—$CF_2$—COOH $CF_3$—(O—$CF_2$)$_2$—O—$CF_2$—COOH $CF_3$—(O—$CF_2$)$_1$—O—$CF_2$—COOH $R_f$—(O—$CF_2$—$CF_2$)$_k$—O—$CF_2$—COOH with k being 1, 2 or 3

$CF_3$—(O—$CF_2$—$CF_2$)$_1$—O—$CF_2$—COOH $C_2F_5$—(O—$CF_2$—$CF_2$)$_1$—O—$CF_2$—COOH $C_3F_7$—(O—$CF_2$—$CF_2$)$_1$—O—$CF_2$—COOH $C_4F_9$—(O—$CF_2$—$CF_2$)$_1$—O—$CF_2$—COOH $C_2F_5$—(O—$CF_2$—$CF_2$)$_2$—O—$CF_2$—COOH $CF_3$—(O—$CF_2$—$CF_2$)$_2$—O—$CF_2$—COOH $C_3F_7$—(O—$CF_2$—$CF_2$)$_2$—O—$CF_2$—COOH $C_4F_9$—(O—$CF_2$—$CF_2$)$_2$—O—$CF_2$—COOH $R_f$—O—$CF_2$—COOH $C_3F_7$—O—$CF_2$—COOH $CF_3$—O—$CF_2$—$CF_2$—$CF_2$—O—$CF_2$—COOH $CF_3$—CHF—O—$(CF_2)_o$—COOH with o being an integer of 1, 2, 3, 4, 5 or 6

$CF_3$CFH—O—$(CF_2)_3$—COOH $CF_3$CFH—O—$(CF_2)_5$—COOH $CF_3$—$CF_2$—O—$(CF_2)_o$—COOH with o being as above $CF_3$—$CF_2$—O—$(CF_2)_3$COOH $CF_3$—$CF_2$—O—$(CF_2)_5$COOH In the above generic formulas, $R_f$ has the meaning as defined above in respect of generic formula (I). It is understood that while the above list of compounds only lists the acids, the corresponding salts, in particular the $NH_4^+$, potassium, sodium or lithium salts can equally be used.

The amount of fluorinated carboxylic acid or salt thereof in the aqueous dispersion and coating composition is not particularly limited and is typically determined by the amount of the fluorinated carboxylic acid or salt used to produce the dispersion of a non-melt-processible polymer of TFE. Typically, the amount of fluorinated carboxylic acid or salt is reduced in the dispersion by a suitable technique for reducing the amount of fluorinated surfactants. For example, the amount of fluorinated carboxylic acid or salt thereof may be reduced by contacting the dispersion with an anion exchange resin. Although the compounds according to formula (I) eliminate more readily from the body of a living organism, it generally is still desirable to recover them from the dispersions for cost reasons. Hence, the amount of fluorinated carboxylic acid or salts thereof in the dispersion and coating composition formulated therewith will typically be not more than 1000 ppm based on the amount of the fluoropolymer particles. In a particular embodiment, the amount is not more than 500 ppm and in a still further embodiment, it is not more than 300 ppm. Desirable amounts are typically between 0.01 ppm and 50 ppm.

PTFE Particles

The particles of non-melt processable polymer of TFE (hereinafter also referred to as PTFE particles) are conveniently produced using an aqueous emulsion polymerization of TFE using one or more fluorinated carboxylic acids of formula (I) as fluorinated surfactant. The polymerization may optionally involve the use of a perfluorinated comonomer such as for example a perfluorinated vinyl ether or a perfluorinated C3-C8 olefin such as for example hexafluoropropylene (HFP). The term 'perfluorinated monomer' as used in connection with the present invention not only includes monomers consisting of carbon and fluorine atoms but also includes monomers in which some of the fluorine atoms are replaced by chlorine or bromine such as for example in chlorotrifluoroethylene. Nevertheless, a perfluorinated monomer as used herein does not have carbon-hydrogen bonds in the molecule. The fluorinated surfactant may be added prior to the polymerization at a whole or part of it can be added during the course of polymerization.

The amount of fluorinated surfactant is generally between 0.001 and 1% by weight relative to the amount of solids. Following polymerization, the fluorinated surfactant may be recovered from the dispersion using an anion exchange resin as disclosed in WO 00/35971.

The aqueous emulsion polymerization of TFE is initiated with a free radical initiator. Any of the known or suitable initiators for initiating an aqueous emulsion polymerization of TFE can be used. Suitable initiators include organic as well as inorganic initiators although the latter are generally preferred. Examples of inorganic initiators that can be used include for example ammonium-alkali- or earth alkali salts of persulfates, permanganic or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. Generally, when manganic or permanganic based initiators are used, the manganic ions may be removed subsequent to the polymerization by contacting the resulting dispersion with a cation exchange resin.

The polymerization will typically be conducted at a temperature of 10 to 100° C., preferably between 20° C. and 90° C. and at a pressure of 2 to 50 bar, preferably 6 to 25 bar. The aqueous emulsion polymerization system may further comprise auxiliaries, such as buffers, complex-formers and gas carriers. In a particular embodiment, a seeded polymerization may be used to produce the PTFE particles. That is, the polymerization is initiated in the presence of small particles of fluoropolymer, typically small PTFE particles having a volume average diameter of between 50 and 100 nm. Such seed particles may be produced in a separate aqueous emulsion polymerization and may be used in an amount of 0.5 to 10% by weight based on the weight of water in the aqueous emulsion polymerization. The use of seed particles allows better control over the PTFE particle size that is desired and avoids formation of coagulum during polymerization, which could cause explosion during the polymerization. The seed particles may for example be produced by polymerizing TFE in the presence of small amounts of a partially fluorinated monomer (e.g. as disclosed below) or a perfluorinated co-monomer such as a perfluoroalkyl vinyl monomer or a perfluorinated vinyl ether or other perfluorinated co-monomer as disclosed below.

In a particular embodiment of the invention, core-shell particles are produced. Core-shell PTFE particles include particles of which an inner layer (core) comprises a TFE polymer that has a different chemical composition compared to the TFE polymer in the outer layer of the particles. To produce core-shell PTFE particles, a partially fluorinated co-monomer or a non-fluorinated comonomer is added at the final stage of the polymerization, so as to obtain particles having a shell that comprises a copolymer of TFE and a partially fluorinated comonomer or non-fluorinated comonomer. Suitable partially fluorinated co-monomers for use in the final polymerization stage include those according to the general formula:

$$CR^1R^2=CFR^3$$

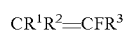

wherein each of $R^1$, $R^2$ and $R^3$ independently represents H, Cl, F or a perfluoro alkyl group, for example of 1 to 3 carbon atoms, with the proviso that at least one of $R^1$, $R^2$ and $R^3$ represents H. Specific examples of partially fluorinated co-monomers that may be used include vinylidene fluoride, trifluoroethene, pentafluoropropene and heptafluorobutene. Suitable non-fluorinated co-monomers include alpha-olefins such as ethylene and propylene.

Still further comonomers that may be added or used in the making of the shell of core-shell PTFE particles include fluorinated comonomers that have an anionic group including a carboxylic or sulfonic acid group. Suitable comonomers having an ionic group or precursor thereof and the use thereof in making core-shell PTFE particles are disclosed in EP 1529785.

The final polymerization stage, during which one or more of the aforementioned co-monomers are added, is typically defined as the stage during which the last 25% by weight or less of polymer solids are produced and accordingly, the shell would constitute 25% by weight or less of the total weight of the PTFE particle. In a particular embodiment, the shell constitutes not more than 20% by weight or not more than 15% by weight of the PTFE particle weight. The total amount of partially fluorinated and/or non-fluorinated monomer used in the final polymerization stage is typically chosen so as to produce a TFE copolymer that has between 0.05 and 20% by weight of partially fluorinated and/or non-fluorinated comonomer or typically between 0.1% and 15% by weight. In a particular embodiment, the amount of partially fluorinated and/or non-fluorinated comonomer in the TFE copolymer of the shell is between 0.5 and 10% by weight.

In a particular embodiment, a perfluorinated co-monomer may be used in addition to the partially fluorinated or non-fluorinated comonomer in the final polymerization stage. Examples of perfluorinated co-monomers include perfluorinated vinyl ethers, for example those of the formula:

$$CF_2=CF-O-R_f$$

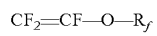

wherein $R_f$ represents a perfluorinated aliphatic group that may contain one or more oxygen atoms. Specific examples include perfluoroalkyl vinyl ethers such as perfluoromethyl vinyl ether (PMVE), perfluoroethyl vinyl ether and perfluoro n-propyl vinyl ether (PPVE-1), perfluoro-2-propoxypropylvinyl ether (PPVE-2), perfluoro-3-methoxy-n-propylvinyl ether and perfluoro-2-methoxy-ethylvinyl ether. Particular perfluoro alkyl vinylethers include gaseous perfluoro alkyl vinylethers or those that have a vapor pressure of at least 10 kPa at polymerization temperature. Further examples of suitable perfluorinated comonomers include perfluorinated allyl ethers and perfluorinated olefins having 3 to 8 carbons such as for example hexafluoropropylene.

The total amount of comonomer, whether fully fluorinated, partially fluorinated or non-fluorinated, used to prepare the PTFE particles should generally be kept low enough so as not to impair the overall non-melt processible characteristics of the PTFE particles. Accordingly, the total amount of comonomer should typically not exceed 1% by weight based on the total weight of PTFE.

During the final polymerization stage, further amounts of initiator or initiator components may be added to increase the polymerization rate and/or to reduce the molecular weight of the copolymer formed. Further, during the final polymerization stage, one or more chain transfer agents may be added as well.

Thus, in a particular embodiment, the PTFE particles may be obtained by using a seed polymerization of TFE using PTFE particles that have been produced by copolymerizing TFE with a partially fluorinated or perfluorinated comonomer. At the final stage of the polymerization may then be added a partially fluorinated or non-fluorinated comonomer. Accordingly, the thus produced PTFE particles will comprise a core of a copolymer of TFE, an intermediate shell of homopolymer of TFE and a shell of copolymer of TFE and partially fluorinated or non-fluorinated comonomer. Further details regarding the polymerization conditions to produce such PTFE particles may be found in EP 30663. Typically, the core will comprise between 5 and 15% by weight of the PTFE particle and the homopolymer of PTFE will comprise between 90 and 70% by weight.

The PTFE particles typically have an average particle size (volume average diameter) of 20 nm to 500 nm, typically 50 nm to 350 nm. In a particular embodiment in connection with this invention, a mixture of PTFE particles is used that have a distinct average particle size such that the mixture has a bimodal or multi-modal distribution in particle size. For example, in one embodiment, a mixture of PTFE particles having an average particle size of not more than 100 nm, for example between 30 and 90 nm or between 50 and 80 nm, is mixed with PTFE particles having an average particle size of at least 180 nm, for example 190 nm to 400 nm or 200 nm to 350 nm. In a particular embodiment, when a mixture of PTFE particles is used, at least one of the PTFE particle dispersion used to obtain the mixture is comprised of the above described core-shell PTFE particles.

The amount of PTFE particles in the coating composition may vary widely and will generally depend on whether the coating composition is to be used in a single coating system or multi-layer coating system. When used in a multi-layer coating system, the amount of PTFE particles according to the invention will generally differ depending on whether the coating composition is for a primer layer, an intermediate coating layer or the top coating layer. Generally, a low amount should be used in the primer layer and a higher amount can be used in the intermediate and/or topcoat layer. Generally, the amount of PTFE particles in the coating composition is at least 10% by weight, typically between 15% by weight and up to 95% by weight based on the total weight of solids in the composition.

Non-Ionic Surfactant

The coating composition includes a non-melt processible polymer of TFE and a non-ionic surfactant. Examples of useful non-ionic surfactants include those according to the formula:

$$R^1-O-[CH_2CH_2O]_n-[R^2O]_m-R^3 \quad (XV)$$

wherein $R^1$ represents an aromatic or aliphatic, linear or branched hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (X), the units indexed by n and m may appear as blocks or they may be present in an alternating or random configuration. Examples of non-ionic surfactants according to formula (X) above include alkylphenol oxethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (X) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 from Clariant GmbH. Non-ionic surfactants according to formula (X) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80. Further suitable non-ionic surfactants that are commercially available include Tergitol™ TMN 6, Tergitol™ TMN 10, or Tergitol™ TMN 100X. Mixtures of non-ionic non-fluorinated surfactants may be used as well.

The non-ionic non-fluorinated surfactant is generally added to the aqueous dispersion of the PTFE particles prior to admixing the dispersion with the non-fluorinated polymer of the coating composition. For example, the non-ionic surfactant may be added before, during or after an up-concentration of the PTFE aqueous dispersion and/or in the process of reducing the amount of fluorinated surfactant in the dispersion. Additional non-ionic non-fluorinated surfactant may be added directly to the coating composition if desired. Typically, the amount of non-ionic non-fluorinated surfactant in the coating composition is typically between 0.5 and 15% by weight based on the weight of PTFE particles in the coating composition. According to a particular embodiment, the amount is between 1 and 12% by weight.

Non-Fluorinated Polymer

The composition additionally contains a non-fluorinated polymer. The non-fluorinated polymer may be selected from a large variety of polymers so as to obtain one or more desired properties in the final coating. Non-fluorinated polymers include for example silicone resins, polysulfones, polyamides including aliphatic and alicyclic polyamides, polyamide acids including salts thereof and polyamide acid amides, polyimides, polyamide-imides, polybismaleimides, acrylic polymers, methacrylic polymers, polysulfides including polyarylene sulfides such as polyphenylene sulfides, alkyd resins, polyvinyl chlorides, polybutadienes, nitrocelluloses, urea-formaldehyde resins, polyurethanes, polycarbonates and vinyl cyclic acetals and mixtures thereof. Examples of polyamide imide and polybismaleimide polymers include those disclosed in U.S. Pat. No. 4,548,986. Examples of suitable polyamides include aromatic polyamides such as poly (m-phenylenediamine isophthalamide) and as disclosed in U.S. Pat. No. 4,548,986, polyamide acids as disclosed in U.S. Pat. No. 3,179,614 and U.S. Pat. No. 4,049,863 and polyamide acid amides as described in U.S. Pat. No. 3,260,691.

Suitable polysulfone resins include the polyether sulfones disclosed in U.S. Pat. No. 3,981,945, U.S. Pat. No. 4,090,933 and U.S. Pat. No. 4,131,711. Polysulphides that can be used include polyarylene sulfides as disclosed in U.S. Pat. No. 4,287,112. Examples of acrylic or methacrylic polymers that can be used include polymers of alkyl acrylates, alkyl methacrylates, acrylic acid and methacrylic acid, esterified with a glycidyl ester sold by Shell Chemical Company as "Cardura E" ester as disclosed in U.S. Pat. No. 4,123,401. Particular examples include: methyl methacrylate/2-ethylhexyl acrylate/methacrylic acid terpolymers, preferably the 40-50/48-52/1-4 (weight ratio) terpolymers; butyl acrylate/methyl methacrylate/acrylic acid terpolymers esterified with "Cardura E," the units preferably present in a 23-27/33-37/15-19/21-25 ratio; styrene/methyl methacrylate/acrylic acid terpolymers esterified with "Cardura E," the units preferably present in a 28-32/8-32/15-19/21-25 ratio; and methyl methacrylate/ethyl acrylate/methacrylic acid terpolymers, preferably the 37-41/55-59/1-6 terpolymers.

The non-fluorinated polymer is typically comprised in the composition in an amount of at least 5 or 10% by weight, typically between 10% by weight and 95% by weight based on the total weight of solids in the composition. The amount of the non-fluorinated polymer may vary depending on whether the coating composition is for a primer, an intermediate or a topcoat layer. Generally, the amount of binder will be larger in a coating composition for a primer and may be used in a lesser amount or may not be used at all in an intermediate layer or a topcoat layer. The weight ratio of non-fluorinated polymer to PTFE polymer particles in a coating composition may be from 9:1 to 1:9, typically from 8:1 to 1:4 or between 4:1 to 2:1.

Optional Further Components of the Coating Composition

The composition may further contain a perfluorinated melt-processible fluoropolymer such as e.g. a copolymer of TFE that is melt-processible. Examples of such copolymers include copolymers of TFE and HFP which are known in the art as FEP polymers or copolymers of TFE and a perfluorinated vinyl ether, such as those disclosed above, which are known in the art as PFA polymers. Typically, such copolymers may be produced by emulsion polymerization and will result in an aqueous dispersion which can be blended with the other components of the composition for the primer coating. Generally, the average particle size of such copolymers is between 20 nm and 500 nm and typically between 50 and 350 nm. According to a particular embodiment, the mixture of PTFE particles and copolymer particles form a bimodal or multi-modal particle size distribution. For example, in one embodiment the PTFE particles may have an average particle size of at least 180 nm and the particle size of the copolymer particles is not more than 100 nm, typically not more than 80 nm.

The coating composition may contain further components such as organic solvents, colloidal silica, mica, fillers, coloring agents, levelling agents, adhesion promoters and tackifiers. The composition may further include in particular film hardeners as disclosed in WO 96/13556. Examples of film hardeners include silicate compounds, such as metal silicates e.g. aluminium silicate, and metal oxides such as titanium dioxide and aluminium oxide.

In a particular embodiment, the coating composition may further comprises one or more anionic non-fluorinated surfactants. Anionic non-fluorinated surfactants that may be used in connection with this invention include surfactants that have an acid group. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulphonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulfonate) from Stepan Company, Hostapur™ SAS 30 (secondary alkyl sulfonate sodium salt), Emulsogen™ LS (sodium lauryl sulfate) and Emulsogen™ EPA 1954 (mixture of $C_{12}$ to $C_{14}$ sodium alkyl sulfates) available from Clariant GmbH and TRITON™ X-200 (sodium alkylsulfonate) available from Union Carbide, and Edenor C12 available from Cognis. Further suitable anionic surfactants include the sulfosuccinates disclosed in EP 1538177 and EP 1526142. Preferred are anionic hydrocarbon surfactants having a carboxylic acid group.

The coating composition can be conveniently produced by blending together the various components making up the composition. Generally the PTFE particles will be in the form of an aqueous dispersion and the optional copolymer of TFE is generally also in the form of an aqueous dispersion. These dispersions may be simply blended together and the non-fluorinated polymer may be added thereto. The non-fluorinated polymer may be in the form of an aqueous dispersion as well or may be dissolved or dispersed in an organic solvent such as for example N-methylpyrrolidone, or an aromatic solvent such as toluene, xylene and the like. Other further ingredients may be added to the composition as aqueous dispersion or from a solution or dispersion in an organic solvent.

The coating composition according to the invention can be used to provide an anti-stick coating on a substrate. The coating composition can be used in connection with a single layer coating system but is typically used in connection with a multi-layer coating system. In one embodiment, the coating composition is used to provide a primer coating on various substrates on which firm adhesion of PTFE and other fluoropolymers is desired. Further layers of the multi-layer coating system may or may not be provided with a coating composition according to the invention. Thus in one embodiment of a two-layer coating system, the primer and the topcoat are provided by using a coating composition according to the invention. In another embodiment, the primer coating, intermediate coating(s) and top coat of a multi-layer coating system are provided using a coating composition according to the invention. In a particular embodiment, the coating composition of the topcoat of a multi-layer coating may contain an acrylic or methacrylic polymer latex as described above. The primer and/or intermediate coatings will typically include a heat resistant binder in the coating composition such as for example polysulfones, polyamides, polyimides, a polyamide-imides, polybismaleimides and mixtures thereof.

Generally, the composition is particularly beneficial to provide at least a primer coating on metal substrates or glass substrates. Examples of metal substrates include aluminium, steel and stainless steel. Prior to application of the composition to these substrates, the substrate may be roughened to further enhance adhesion of the primer coating to the substrate. Typically, sand blasting or etching is used to roughen a metal substrate. The substrate may be a so-called smooth substrate. A smooth substrate is typically obtained by chemical cleaning and light etching of the substrate and typically has an average surface roughness (Ra) of less than 2.5 µm and preferably less than 1.25 µm. By comparison, an untreated rolled aluminium substrate has a surface roughness of 0.25 to 0.5 µm and a sandblasted or gritblasted aluminium may have an average surface roughness of 4 to 5.25 µm. The composition may be applied by any of the known techniques to apply coatings to substrates including for example spray coating, roller coating, curtain coating or coil coating the composition.

Following application of the composition, the coating is generally dried by subjecting the coating to elevated temperature of 40 to 100° C. One or more additional layers of non-melt processible PTFE may be then be provided in a similar way. Such one or more layers of PTFE may or may not comprise melt-processible fluoropolymers such as melt-processible copolymers of TFE. When such melt-processible TFE copolymers are used, the ratio thereof may be varied in a multi-layer coating so as to create a gradient of increasing amount of PTFE towards the top coating. Like-wise, the ratio of the non-fluorinated polymer to the PTFE particles may be varied to create a gradient of decreasing amount of non-fluorinated polymer towards the top coating.

Following application of the one or more coatings, the obtained coated substrate is baked or sintered. Generally, baking is carried out in an oven at a temperature of 350° C. to 450° C., typically from 370° C. to 420° C. The baking and sintering time may vary from 1 to 10 min. and the oven may have a constant temperature or an increasing temperature profile may be used, i.e. the temperature may be increased from an initial lower temperature to a higher temperature later in the baking cycle. Generally, baking of the coated article is carried out by conveying the coated article through an oven with an increasing temperature profile from entrance to exit.

The invention is further illustrated with reference to the following examples without the intention to limit the invention thereto.

EXAMPLES

Test Methods

Particle Size

The latex particle size determination was conducted by means of dynamic light scattering with a Malvern Zetazizer 1000 HAS in accordance to ISO/DIS 13321. Prior to the measurements, the polymer latexes as yielded from the polymerizations were diluted with 0.001 mol/L KCl-solution, the measurement temperature was 25° C. in all cases. The reported average is the Z-average particle diameter.

SSG: Standard specific gravity was measured according ASTM 4894-04

Solid Content of raw dispersions: Determination of solid content was done by subjecting the latex sample to a temperature up to 250° C. for 30 min.

Solid Content of up-concentrated dispersions: Determination of solid content was done according to ISO 12086.

Pen Ball Test

The hardness of the coated substrates was tested in accordance with the Whitford Test Method 137C, using a Whitford Scratch tester. The substrate used was a smooth aluminium substrate. The pen ball test is done with vegetable oil at 170° C. as is described in WO 02/14065. The higher the test value, the better.

Crosshatch Test

The adhesion of the coatings to the substrate was evaluated using the crosshatch test, in accordance with DIN EN ISO 2409. A crosshatch pattern of 1 mm was made in the coated substrates by using a knife. Adhesive tape (Tesa™ 4104/50 mm) was applied as firmly as possible onto the cut lines. The adhesive tape was pulled vertically. After the tape was applied and pulled for 10 times, the appearance of the cut lines was evaluated according to DIN EN ISO 2409 (0=superior; 5=bad coating). Any damage to the topcoat and primer coat was determined under a microscope and is separately reported in below table.

Water and Salt Water Cooking Test

The coated substrates were immersed in boiling water or 10% salt water (aqueous NaCl solution) during 48 hours. After cooling to room temperature, the samples were tested according to the crosshatch test as given above.

Polymerization of Fluorinated Monomers (Fluoroolefin) Using a Fluorinated Carboxylic Acid The polymerization experiments were performed in a 40 l kettle equipped with an impeller agitator and a baffle. The kettle was charged with 30 l of deionized water and set to 35° C.; the kettle was evacuated repeatedly to remove oxygen; Agitation speed was set to 165 rpm. The oxygen free kettle was charged with 70 mmol fluorinated emulsifier (unless specified differently) as listed in table 3 and the following materials were added: 0.5 ml of a solution containing 40 mg of copper sulphate penta hydrate and 1 mg of conc. sulphuric acid; 15 g of a 25 w-% of aqueous ammonia solution and 5.6 g of $CF_3CF_2CF_2$—O—$CF(CF_3)$—$CF_2$—O—$CF=CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization is indicated by a pressure drop. During polymerization the pressure was maintained at 1.5 MPa by feeding TFE continuously. After 3.2 kg of TFE had been added, the monomer valve was closed and the pressure was released. The characteristics of the obtained polymer latices are summarized in table 3.

1000 ml of this polymer dispersion were coagulated by adding 20 ml hydrochloric acid under agitation. The coagulated material was agglomerated with gasoline and washed repeatedly. The agglomerated polymer was dried overnight at 200° C. in a vacuum oven; test data are given in table 3.

TABLE 1

| Emulsifiers used: | |
|---|---|
| $C_7F_{15}COONH_4$ | Comparative example C-1 |
| $CF_3-O-(CF_2)_3-O-CF(CF_3)-COONH_4$ | Comparative example C-2 |
| $C_3F_7-O-CF(CF_3)-CF_2-O-CF_2-COONH_4$ | Comparative example C-3 |
| $CF_3-O-(CF_2)_3-O-CF_2-COONH_4$ | Compound 1 |
| $CF_3-OCF_2-O-CF_2-COONH_4$ | Compound 2 |
| $CF_3-OCF_2-OCF_2-COONH_4$ | Compound 3 |
| $CF_3-(OCF_2)_3-OCF_2-COONH_4$ | Compound 4 |
| $C_3F_7-O-CF_2-COONH_4$ | Compound 5 |
| $CF_3-O-CF_2-CF_2-COONH_4$ | Compound 6 |
| $C_2F_5-O-CF_2-CF_2-COONH_4$ | Compound 7 |
| $C_3F_7-O-CF_2-CF_2-COONH_4$ | Compound 8 |
| $C_4F_9-O-CF_2-CF_2-COONH_4$ | Compound 9 |
| $C_2F_5-O-CF_2-CF_2-O-CF_2-COONH_4$ | Compound 10 |
| $CF_3-O-CF_2-CF_2-CF_2-O-CHF-CF_2-COONH_4$ | Compound 11 |
| $CF_3-O-CF_2-CF_2-CF_2-O-CHF-COONH_4$ | Compound 12 |
| $C_3F_7-O-CFH-CF_2COONH_4$ | Compound 13 |
| $CF_3-CFH-O-(CF_2)_5-COONH_4$ | Compound 14 |
| $CF_3-CFH-O-(CF_2)_3-COONH_4$ | Compound 15 |
| $C_3F_7-O-CFH-CF_2-O-CH_2-COONH_4$ | Compound 16 |
| $C_3F_7-O-CFH-COONH_4$ | Compound 17 |

Preparation of Compound 1:
$CF_3OCF_2CF_2CF_2OCF_2COONH_4$

Oxidation of perfluorinated vinyl ethers with oxygen in the presence of $SbF_5$ was carried out as described in U.S. Pat. No. 4,987,254. The initially formed acid fluorides were esterified with methanol and purified by distillation. The distilled esters were converted to the corresponding ammonium salts by saponification with aqueous ammonia. A dry flask equipped with a magnetic stirrer bar, thermometer, dry ice reflux condenser, dropping funnel, and gas inlet tube was charged with 5 g of graphite. The flask was flushed with nitrogen and 332 g of $CF_3OCF_2CF_2CF_2OCF=CF_2$ were added at room temperature. 2.6 g of $SbF_5$ was added via the dropping funnel and oxygen was charged to the flask at ambient pressure. An exothermic reaction indicated the oxidation. Total reaction time was 14 h. After the first hour 2.6 g and after 7 hours 3.5 g of $SbF_5$ were added. Esterification was achieved by slow addition of 50 g of methanol to the reaction mixture. The resulting ester was isolated from the batch by flash distillation after addition of 300 g water and 50 g methanol. The distillate formed two phases. The lower phase was separated and the upper phase retuned to the flask. 310 g of lower phase were collected. GC analysis showed a content of 52% of $CF_3OCF_2CF_2CF_2OCF_2COOCH_3$. Purification via fractionated distillation resulted in 144 g pure ester with a boiling point of 51° C. at 52 mbar. $CF_3OCF_2CF_2COOCH_3$ was isolated as by product. Saponification of the ester with aqueous ammonia at 60-80° C. and removal of methanol by distillation resulted in an aqueous solution of $CF_3OCF_2CF_2CF_2OCF_2COONH_4$. All structures were confirmed by F-NMR spectra.

Preparation of Compound 5:
$CF_3CF_2CF_2OCF_2COONH_4$

Using the procedures described in U.S. Pat. No. 4,987,254, $CF_3CF_2CF_2OCF=CF_2$ was converted to $CF_3CF_2CF_2OCF_2COOCH_3$ (bp 102-104° C.). Saponification with aqueous ammonia and removal of methanol by distillation resulted in an aqueous solution of $CF_3CF_2CF_2OCF_2COONH_4$. Structures were confirmed by F-NMR spectra.

Preparation of Compound 17:
$CF_3CF_2CF_2OCHFCOONH_4$

A 2 liter glass flask equipped with a mechanical stirrer, thermometer and reflux condenser (−80° C.) is used. Heating of the flask is provided by an electric heating mantle. The conversion is carried out as a one pot reaction. 275 g perfluoropropyl vinyl ether (PPVE), 280 g KOH, 602 g water, 151 g t-butanol, and 10 g methyl trioctyl ammonium chloride are placed in the flask. The three phase mixture is subjected to vigorous stirring. After initial heating a moderate exothermic reaction occurs. Mixing is continued for nine hours. During this time the internal temperature adjusts to 27-33° C. Mixing is stopped when the exothermic reaction ceases. The reaction mixture forms two layers. The low temperature reflux condenser is replaced by a standard reflux condenser. Sulfuric acid (392 g) is slowly added without external cooling. The batch is heated to reflux. Unreacted PPVE is vented. At about 80° C. internal temperature gas begins to evolve. Heating is continued until the gas evolution has ceased. At this time the internal temperature reaches 101° C. The batch is cooled to RT and the reflux condenser is replaced by a distillation device. No column is used. 110 g methanol is added to the batch and distillation is started. The condensed vapors form two layers. The lower layer is separated and the upper layer is returned to the flask. Distillation is stopped when no more lower phase is formed. In total, 234 g of lower phase are collected. Fractionation of the lower phase yields 167 g of $C_3F_7OCHFCOOCH_3$ with a boiling point of 120-122° C. at ambient pressure.

Calculated yield: 59% based on total PPVE used; 70% based on converted PPVE.

The ester is converted to the ammonium salt by reaction with aqueous ammonia. Methanol is removed by fractionated distillation. The resulting aqueous solution is used as an emulsifier in the polymerization of fluorinated olefins.

Preparation of Compound 12:
$CF_3OCF_2CF_2CF_2OCHFCOONH_4$

A glass flask equipped with a reflux condenser, thermometer, and magnetic stirrer was used. Perfluoromethoxy propyl vinyl ether (498 g), t-butanol (149 g), water (1007 g), potassium hydroxide (280 g), and methyl trioctyl ammonium chloride (10 g) were added to the flask. The resulting two phase mixture was heated to reflux for 16 hours under vigorous stirring. The mixture was cooled to room temperature and sulphuric acid (588 g) was added. The two phase mixture was heated again under vigorous stirring. At about 70° C. gas began to evolve. Heating was continued until the gas evolution ceased. The reflux condenser was replaced by a distillation device which allowed the separation of a lower phase while returning the upper phase to the flask. Methanol (150 g) was added and the mixture was heated for distillation. Distillation was carried out at ambient pressure without any intent for rectification. The condensed vapors separated into two phases. The lower phase was collected and the upper phase was returned to the flask. Distillation was continued until no more lower phase separated from the condensate. The combined crude ester (493 g) was purified by fractionated distillation, resulting in 401 g $CF_3O(CF_2)_3OCHFCOOCH_3$ with a boiling point of 51 to 52° C./22 mbar. This corresponds to a yield of 78%, based on vinyl ether used.

The ester was converted to the ammonium salt by heating with aqueous ammonia and removal of methanol by fractionated distillation.

Alternatively, the previous reaction was repeated but 36 g of an aqueous solution containing 11 g of $CF_3O(CF_2)_3OCHFCOONH_4$ was used as phase transfer catalyst instead of methyl trioctyl ammonium chloride. The mixture was slowly heated to 70° C. internal temperature. Total reaction time was 26 hours. Work up was carried out as described above. 438 g of distilled $CF_3O(CF_2)_3OCHFCOOCH_3$ was received. This corresponds to a yield of 83% (calculation includes the amount of phase transfer catalyst).

The conversion to the ammonium salt was carried out as above.

Preparation of Compound 13: $C_3F_7OCHFCF_2COONH_4$ a. Preparation of $CF_3CF_2CF_2OCHFCF_2CH_2OH$ In a 2 liter glass flask equipped with a stirrer, thermometer, reflux condenser, and dropping funnel were placed 1008 g methanol, 266 g perfluoropropyl vinyl ether, and 9.2 g of Rongalit® (sodium hydroxymethyl sulfinate). The reaction mixture was heated to reflux, resulting in an internal temperature of 29° C. 7.1 g t-butyl hydroperoxide (70% in water) is added in aliquots during a 9 h time frame. The internal temperature reached 52° C. at the end. The reaction mixture showed a single liquid phase and some solids. The liquid was analyzed by GC and indicated a content of 223 g of $C_3F_7OCHFCF_2CH_2OH$ which corresponded to a yield of 75%.

Distillation of the reaction mixture resulted in 171 g of product (bp 54° C./23 mbar) corresponding to an isolated yield of 57%.

b. Preparation of $C_3F_7OCHFCF_2COONH_4$

A 2 liter glass flask equipped with a thermometer, reflux condenser, dropping funnel and stirrer was used. 674 g water, 136 g KMnO4, and 38 g NaOH are placed in the flask. 169 g $C_3F_7OCHFCF_2CH_2OH$ were added to the well stirred mixture via the dropping funnel. The temperature is held below 50° C. Residual permanganate was destroyed by addition of a small amount of methanol. The resulting slurry was filtered to remove the $MnO_2$. After washing the filter cake with water, the combined filtrate was transferred to a distillation apparatus and acidified with 65 g of sulfuric acid. 100 g methanol was added and a flash distillation was started. The distillate formed two layers. The lower layer was separated and the upper layer returned to the distillation pot. In total 182 g lower layer were collected. Fractionation of the crude ester resulted in 137 g of $C_3F_7OCHFCF_2COOCH_3$ with a boiling point of 55-56° C./52 mbar. This corresponds to a yield of 77%.

The ester was converted to the ammonium salt by saponification with aqueous ammonia and subsequent removal of methanol by distillation.

Preparation of Compound 11: $CF_3O(CF_2)_3OCHFCF_2COONH_4$ a. Preparation of $CF_3O(CF_2)_3OCHFCF_2CH_2OH$ Using equipment similar to the described above, 255 g of perfluoromethoxypropyl vinyl ether and 730 g methanol were converted with Rongalit and t-butylhydroperoxide as radical source. Reaction temperature started at 47° C. and reached 64° C. at the end. Work up by distillation yielded 166 g of pure $CF_3O(CF_2)_3OCHFCF_2CH_2OH$ with a boiling point of 60-61° C./20 mbar. This corresponds to a yield of 59%.

b. Preparation of $CF_3O(CF_2)_3OCHFCF_2COONH_4$

A 2 liter glass flask equipped with a thermometer, reflux condenser, dropping funnel and stirrer was used. 159 g of $CF_3O(CF_2)_3OCHFCF_2CH_2OH$, 520 g water, and 100 g sulfuric acid were added to the flask. 190 g KMnO4 were added manually to the liquid over a period of 2 hours while stirring. The reaction temperature increased to 95° C. over time. After a post reaction time of two hours, an aqueous solution of sodium bisulfite was added until a clear solution was formed. 100 g of methanol and in total 400 g of 50% aqueous sulphuric acid were added. Flash distillation of the reaction mixture resulted in a two phase distillate. Fractionation of the lower phase (120 g) gave 85.5 g of $CF_3O(CF_2)_3OCHFCF_2COOCH_3$ (bp 34-35° C./6 mbar; yield 50%).

The ester was converted to the ammonium salt by saponification with aqueous ammonia and subsequent removal of methanol by distillation.

Preparation of Compound 6

$CH_3$—O—$CF_2$—$CF_2$—$COOCH_3$ was fluorinated as described in WO 01/46116; the acid fluoride $CF_3$—O—$CF_2$—$CF_2$—COF was then converted into the methylester. The distilled ester was converted into the ammonia-salt as described above.

Preparation of Compound 14: $CF_3$—CFH—O—$(CF_2)_5COONH_4$

A sample of diacid fluoride, $FCOCF(CF_3)$—O—$(CF_2)_5COF$ (500 g, 1.1 mol) prepared from the hexafluoropropylene oxide (HFPO) coupling of perfluoroadipoyl fluoride as described in U.S. Pub. No. US 2004/0116742 and was added over 2 hours to a stirred slurry of sodium carbonate (500 g, 4.7 mol) in 500 g of diglyme at 85° C. to make the disalt. The reaction liberated $CO_2$ gas. Distilled water (25 g, 1.4 mol) was added at 85° C. The mixture was heated up to 168° C. with $CO_2$ off-gassing and held for 30 minutes. Reaction was cooled down and sulphuric acid (350 g, 3.6 mol) in 1100 g of water was added to make the reaction mixture acidic. Bottom phase was washed with 400 g of 50% sulfuric acid and vacuum distilled to give $CF_3$—CFH—O—$(CF_2)_5COOH$ 426 g, 1.0 mol for a 95% yield having a boiling point of 132-135° C./15 mm. This was followed by the addition of 46 g NaOH in 63 g of water. Dried salts in vacuum oven at 112° C./15 mm Hg to give 386 g of slight yellow sticky solids. To the salt was added sulphuric acid and the lower fluorochemical phase was vacuum distilled. The previous process was repeated two more times to yield a colorless acid. The surfactant $CF_3$—CFH—O—$(CF_2)_5COONH_4$ having a melting point of 159-165° C. was made quantitatively from the reaction of 200 g of acid reacted with excess ammonium hydroxide and dried.

Preparation of Compound 15: $CF_3$—CFH—$O(CF_2)_3COONH_4$

A sample of diacid fluoride, $FCOCF(CF_3)$—O—$(CF_2)_3COF$ (503 g, 1.4 mol) prepared from the HFPO coupling of perfluorosuccinyl fluoride as described in U.S. Pub. No. 2004/0116742 and was added over 2 hours to a stirred slurry of sodium carbonate (387 g, 3.7 mol) in 650 g of diglyme at 78° C. to make the disalt. The reaction liberated $CO_2$ gas. Distilled water (35 g, 1.9 mol) was added at 85° C. The mixture was heated up to 165° C. with $CO_2$ off-gassing and held for 30 minutes. Reaction was cooled down and sulphuric acid (250 g, 2.6 mol) in 1250 g of water was added to make the reaction mixture acidic. To the bottom phase was added 60 g NaOH in 60 g of water. Dried the salt in vacuum oven at 112° C./15 mm and recovered 450 g. To the salt was added 300 g of 50% sulphuric acid and the lower fluorochemical phase was washed once with 200 g of 50% sulphuric acid. Vacuum distillation gave $CF_3$—CFH—O—$(CF_2)_3COOH$ (400 g, 1.3 mol) for a 95% yield having a boiling point of 111° C./15 mm Hg. The acid was treated with caustic followed by sulphuric acid and vacuum distilled. This was repeated a second time to yield a colorless acid. The surfactant $CF_3$—CFH—O—$(CF_2)_3COONH_4$ having a melting point of 64-68° C. was made quantitatively from the reaction of 208 g of acid reacted with excess ammonium hydroxide and dried.

Preparation of Compound C-3: $C_3F_7$—O—CF$(CF_3)$—$CF_2$—O—$CF_2$—$COONH_4$ Conversion of $CF_3CF_2CF_2OCF(CF_3)CF_2OCF$=$CF_2$ to $CF_3CF_2CF_2OCF(CF_3)CF_2OCF_2COOCH_3$ (bp 91-92° C. at 133 mbar) was carried out as described in U.S. Pat. No. 4,987,254. The ester was reacted with aqueous ammonia and methanol was removed by distillation resulting in $CF_3CF_2CF_2OCF(CF_3)CF_2OCF_2COONH_4$. All structures were confirmed by F-NMR spectra. Due to an isomer content in the vinyl ether, an isomer with the structure $CF_3CF_2CF_2OCF_2CF(CF_3)OCF_2COOX$ (X=$CH_3$, $NH_4$) was found.

Preparation of Compound 16: $C_3F_7$—O—$C_2HF_3$—O—$CH_2$—$COONH_4$

A mixture of 320 ml Tetrahydrofurane, 40 g Hydroxy acetic methylester and 188 g PPVE is cooled to 0° C., 27 g KOH-powder are added in small portions—during the addition of KOH, the reaction mixture heats up to 60° C. After the addition of KOH, the whole reaction mixture is agitated for 6 h at 25° C. The precipitated salt is separated by filtration, dissolved in 300 ml water and then treated with 57 g $H_2SO_4$ (conc). The resulting mixture separates in two layers; the lower phase is $C_3F_7$—O—$C_2HF_3$—O—$CH_2$—COOH, 86 g (56%). The distilled acid (bp. 125° C., 20 mbar) is neutralized with 25% aqueous ammonia solution to provide a 30% solution in water.

Compounds 2, 3, 4 were prepared from the corresponding carboxylic acids (purchased from Anles Ltd. St. Petersburg, Russia) by neutralizing with aqueous ammonia.

Compounds 7, 8, 10 were prepared from the corresponding carboxylic acid fluorides (~COF) (purchased from Exfluor, Round Rock, Tex., USA). The acid fluorides were converted by addition of methanol to the methylester. The distilled methylester were saponified with aqueous ammonia at 60-80° C. and methanol is removed by distillation. Compound C-2 was prepared as described in U.S. Pat. No. 6,703,520 (column 7).

Determination of Bio-Accumulation

The perfluorinated and partially fluorinated carboxylates were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)-accredited facility.

The study utilized male Sprague Dawley rats, 6 to 8 weeks of age, and approximately 200 to 250 g body weight at study onset. The test compounds of table 2 were administered at a dose of 73 micro Moles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours. Animals were observed throughout the study for clinical signs of toxicity. Gross necropsy was performed at the termination of each study (96 hours post-dose) with sera and liver samples being retained from each animal.

The concentration of the parent compound or metabolites thereof were quantitatively measured via fluorine NMR on each urine sample for each animal at each time point based on internally added standards.

The bioaccumulation data obtained in accordance with the above test are reported in table 2 below.

TABLE 2

|  | $T_{1/2}$ (h) | % Recovery (96 h) | Compound-related Effects |
|---|---|---|---|
| C-1 | ~550 | 6 | Hepatomegaly |
| C-2 | 29 | 40 | Hepatomegaly |
| C-3 | 95 | 5 | Hepatomegaly |
| Compound 1 | 10 | 73 | — |
| Compound 2 | 12 | 96 | — |
| Compound 3 | 12 | 100 | — |
| Compound 4 | 15 | 50 | — |
| Compound 5 | 11 | 97 | — |
| Compound 6 | 11 | 100 | — |
| Compound 7 | 10 | 100 | — |
| Compound 8 | 12 | 82 | — |
| Compound 9 | 31 | 42 | Hepatomegaly |
| Compound 10 | 10 | 99 | — |
| Compound 11 | 12 | 84 | — |
| Compound 12 | 11 | 95 | — |
| Compound 13 | 11 | 94 | — |
| Compound 14 | 24 | 32 | Hepatomegaly |
| Compound 15 | 8 | 95 | — |
| Compound 16 | 13* | 65* | — |

*No parent compound observed in the urine. $T_{1/2}$ and % recovery are based on elimination of the major metabolite - $C_3F_7$—O—$CHFCOO^-$. $T_{1/2}$ is the time required for the amount of a particular substance in a biological system to be reduced to one half of its value by biological processes when the rate of removal is approximately exponential. In these examples the value of $T_{1/2}$ is calculated by exponential least squares curve fitting ($y = Ae^{Bx}$ and $T_{1/2} = 0.693/B$) where y represents the concentration of analyte in urine and x represents time in hours.

TABLE 3

|  | C-1 | C-2 | C-3 | 1 | 2 (140 mmol) | 3 | 4 | 5 | 6 |
|---|---|---|---|---|---|---|---|---|---|
| Polymerization time (min) | 101 | 77 | 87 | 74 | 109 | 69 | 82 | 73 | 84 |
| Average Particle Size (nm) | 111 | 118 | 113 | 110 | 129 | 115 | 109 | 122 | 122 |
| SSG (g/cm$^3$) | 2.166 | 2.165 | 2.149 | 2.169 | 2.157 | 2.165 | 2.163 | 2.169 | 2.175 |
| Solid content (w-%) | 9.9 | 10.0 | 10.3 | 10.3 | 9.7 | 10.1 | 10.2 | 10.0 | 7.1 |

|  | 7 (140 mmol) | 8 | 9 | 10 | 11 | 12 | 13 | 14 (140 mmol) | 15 |
|---|---|---|---|---|---|---|---|---|---|
| Polymerization time (min) | 73 | 79 | 72 | 72 | 82 | 82 | 83 | 75 | 78 |
| Average Particle Size (nm) | 129 | 115 | 113 | 102 | 126 | 108 | 128 | 127 | 105 |
| SSG (g/cm$^3$) | 2.159 | 2.167 | 2.165 | 2.166 | 2.168 | 2.167 | 2.164 | 2.151 | 2.154 |
| Solid content (w-%) | 10.1 | 10.0 | 10.2 | 10.1 | 10.2 | 10.3 | 10.2 | 8.1 | 10. |

Coating Examples

PTFE Dispersions Used:

Dispersion A:

An up-concentrated PTFE dispersion A having an amount of PTFE particles of about 58% by weight was obtained by polymerization of TFE according to EP 30663, The dispersion further contained ammonium perfluorooctanoic acid in a small amount of less than 1 ppm after ion exchange conducted according to DE 19857111 in the presence of 5% by weight of a non-ionic surfactant (Triton® X 100) based on solid weight. An anionic surfactant (Hostapur® SAS 30) in an amount of 2000 ppm based on solid weight was added prior to up-concentration.

Dispersion B:

An up-concentrated PTFE dispersion B having an amount of PTFE particles of about 58% by weight was obtained by polymerization of TFE according to EP 30663, The dispersion further contained ammonium 2,4,6,8-tetraoxa perfluorodecanoic acid ($CF_3$—$(OCF_2)_4$—$COONH_4$) in an amount of 100 ppm after ion exchange conducted according to DE 19857111 in the presence of 5% by weight of a non-ionic surfactant (Triton® X 100) based on solid weight. An anionic surfactant (Hostapur® SAS 30) in an amount of 2000 ppm based on solid weight was added prior to up-concentration.

Dispersion C:

An up-concentrated PTFE dispersion C having an amount of PTFE particles of about 58% by weight was obtained by polymerization of TFE according to EP 30663. The dispersion contained ammonium 2,4,6,8-tetraoxa perfluorodecanoic acid ($CF_3$—$(OCF_2)_4$—$COONH_4$) in an amount of 3 ppm after ion exchange conducted according to DE 19857111 in the presence of 5% by weight of a non-ionic surfactant (Triton® X 100) based on solid weight. An anionic surfactant (Hostapur® SAS 30) in an amount of 2000 ppm based on solid weight was added prior to up-concentration.

Preparation of Coatings

Smooth and sandblasted aluminium plates (100×100×1 mm) were degreased with acetone prior to coating. A two coat system was used:

Primer Coat

The composition for the primer coat was prepared by blending 67.8 parts Greblon™ black base concentrate, obtained from Weilburger Lackfabrik J. Grebe GmbH, comprising Polyamide imide binder (PAI), 17.24 parts of PTFE dispersion A, B or C as indicated in table 4 below and 14.96 parts deionized water. The weight ratio of PAI to PTFE in the coating composition was 1:1. The primer coat was applied to the aluminium plates by spray application at a pressure of 2 bar, using a Binks™ Model 96 spray gun, so as to obtain a dry coating thickness of about 15-20 μm. The coated aluminium plates were dried at 90° C. during 5 minutes and allowed to cool to room temperature.

Topcoat

The composition for the topcoat was prepared by blending 13.10 parts Greblon™ Antistic Topcoat Concentrate (available from Weilburger Lackfabrik J. Grebe GmbH), 72.0 parts of PTFE dispersion and 14.9 parts deionized water. The composition for the topcoat did not contain PAI. The topcoat was applied to the aluminium plates coated with a primer coat, as described above, using a spray gun, so as to obtain a dry coating thickness of 25-35 μm. The coated aluminium plates were dried at 90° C. during 5 min, followed by 250° C. during 10 min and finally the coated plates were sintered at 400° C. during 10 min.

Results

The obtained coated samples were tested and the test results are indicated in below table 4.

TABLE 4

| | test results | | |
|---|---|---|---|
| | Dispersion | | |
| | Dispersion A | Dispersion B | Dispersion C |
| Smooth Intercoat | | | |
| Cross hatch | 2 | 3 | 3 |
| Water cooking | 2 | 4 | 2 |
| Salt water cooking | 4 | 3 | 3 |

TABLE 4-continued

| | test results | | |
|---|---|---|---|
| | Dispersion | | |
| | Dispersion A | Dispersion B | Dispersion C |
| Smooth Primecoat | | | |
| Cross hatch | 2 | 1 | 1 |
| Water cooking | 1 | 2 | 2 |
| Salt water cooking | 2 | 2 | 2 |
| Sandblasted Intercoat | | | |
| Cross hatch | 1 | 2 | 1 |
| Water cooking | 1 | 2 | 2 |
| Salt water cooking | 1 | 2 | 1 |
| Sandblasted Primecoat | | | |
| Cross hatch | 1 | 1 | 1 |
| Water cooking | 1 | 2 | 1 |
| Salt water cooking | 1 | 2 | 1 |
| Pen ball test | 3+ | 4 | 3+ |

Hatch test: 0 = superior/5 = miserable
Pen ball: 0 = miserable/9 = superior

What is claimed is:

1. Coating composition comprising (i) an aqueous dispersion of fluoropolymer particles comprising a non-melt processible polymer of tetrafluoroethylene, (ii) a fluorinated surfactant, (iii) a non-ionic non-fluorinated surfactant and (iv) a non-fluorinated polymer, wherein said fluorinated surfactant is selected from fluorinated carboxylic acids or salts thereof of the general formula (I):

[$R_f$—O-L-COO$^-$]$_i$X$^{i+}$ (I)

wherein L represents a linear partially fluorinated alkylene group or an aliphatic hydrocarbon group, $R_f$ represents a linear partially or fully fluorinated aliphatic group or a linear partially or fully fluorinated aliphatic group interrupted with one or more oxygen atoms, X$^{i+}$ represents a cation having the valence i and i is 1, 2 or 3.

2. Coating composition according to claim 1 wherein said fluorinated surfactant is present in said composition in an amount of not more than 500 ppm based on the amount of said fluoropolymer particles.

3. Coating composition according to claim 1 wherein the anion of said fluorinated carboxylic acids or salts thereof have a molecular weight of not more than 500 g/mol.

4. Coating composition according to claim 1 wherein L is a linear partially fluorinated alkylene groups having 1 to 6 carbon atoms having not more than 2 hydrogen atoms and aliphatic hydrocarbon groups having 1 to 6 carbon atoms.

5. Coating composition according to claim 1 wherein $R_f$ is selected from the group consisting of linear perfluorinated aliphatic groups having 1 to 6 carbon atoms; linear perfluorinated aliphatic groups interrupted with one or more oxygen atoms of which alkylene groups between oxygen atoms have not more than 6 carbon atoms and wherein the terminal alkyl group has not more than 6 carbon atoms; linear partially fluorinated aliphatic groups having 1 to 6 carbon atoms and not more than 2 hydrogen atoms and linear partially fluorinated aliphatic groups interrupted with one or more oxygen atoms and which have not more than 2 hydrogen atoms.

6. Coating composition according to claim 1 wherein the fluorinated carboxylic acid or salt thereof when administered to rat shows a renal recovery rate of at least 50% of the administered amount, 96 hours after administration and wherein the renal half-life ($T_{1/2}$) is not more than 30 hours.

7. A coating composition according to claim 1 wherein the fluorinated carboxylic acid or salts are selected from fluorinated carboxylic acid or salts of which any fluorinated aliphatic portion has not more than 3 carbon atoms.

8. A coating composition according to claim 1 wherein L is selected from the group consisting of —CFH—(CF$_2$)$_h$— wherein h is 0, 1, 2, 3, 4 or 5; —CF$_2$—CFH—(CF$_2$)$_d$— wherein d is 0, 1, 2, 3 or 4; —CH$_2$—(CF$_2$)$_h$— wherein h is 1, 2, 3 or 4; and —(CH$_2$)$_c$— wherein c is 1, 2, 3 or 4.

9. A coating composition according to claim 1 wherein $R_f$ corresponds to the following formula:

$R_f^1$—[OR$_f^2$]$_p$—[OR$_f^3$]$_q$ (II)

wherein $R_f^1$ is a perfluorinated linear aliphatic group of 1 to 6 carbon atoms, $R_f^2$ and $R_f^3$ each independently represents a linear perfluorinated alkylene of 1, 2, 3 or 4 carbon atoms and p and q each independently represent a value of 0 to 4 and wherein the sum of p and q is at least 1.

10. A coating composition according to claim 1 wherein $R_f$ corresponds to the following formula:

R$^7_f$—(O)$_t$—CFH—CF$_2$— (III)

wherein t is 0 or 1 and R$^7_f$ represents a linear partially or fully fluorinated aliphatic group optionally interrupted with one or more oxygen atoms.

11. A coating composition according to claim 1 wherein $R_f$ corresponds to the formula:

$R_f^8$—(OCF$_2$)$_a$— (IV)

wherein a is an integer of 1 to 6 and $R_f^8$ is a linear partially fluorinated aliphatic group or a linear fully fluorinated aliphatic group having 1, 2, 3 or 4 carbon atoms.

12. A coating composition according to claim 1 wherein $R_f$ corresponds to the formula:

$R_f^9$—O—(CF$_2$)$_b$— (V)

wherein b is an integer of 1 to 6, preferably 1, 2, 3 or 4 and $R_f^9$ is a linear partially fluorinated aliphatic group or a linear fully fluorinated aliphatic group having 1, 2, 3 or 4 carbon atoms.

13. A coating composition according to claim 1 wherein the fluorinated carboxylic acid corresponds to the following formula:

[$R_f^a$—(O)$_t$—CHF—(CF$_2$)$_n$—COO$^-$]$_i$X$^{i+}$ (VI)

wherein $R_f^a$ represents a linear partially fluorinated aliphatic group optionally interrupted with one or more oxygen atoms, t is 0 or 1 and n is 0 or 1, X$^{i+}$ represents a cation having a valence i and i is 1, 2 or 3, with the proviso that when t is 0, the $R_f^a$ contains at least one ether oxygen atom.

14. A coating composition according to claim 1 wherein the fluorinated carboxylic acid corresponds to the following formula:

$R_f^b$—(O)$_t$—CFH—CF$_2$—O—R-G (VII)

wherein $R_f^b$ represents a linear partially or fully fluorinated aliphatic group optionally interrupted with one or more oxygen atoms, R is an aliphatic hydrocarbon group, G represents a carboxylic acid or salt thereof, t is 0 or 1.

15. A coating composition according to claim 1 wherein the fluorinated carboxylic acid or salt thereof is selected from the group consisting of C$_3$F$_7$—O—CHF—COOH
CF$_3$—O—CF$_2$CF$_2$—CF$_2$—O—CHF—COOH
CF$_3$CF$_2$CF$_2$—O—CF$_2$CF$_2$—CF$_2$—O—CHF—COOH
CF$_3$—O—CF$_2$—CF$_2$—O—CHF—COOH CF₃—O—CF₂—O—CF₂—CF₂—O—CHF—COOH
CF₃—(O—CF₂)₂—O—CF₂—CF₂—O—CHF—COOH
CF₃—(O—CF₂)₃—O—CF₂—CF₂—O—CHF—COOH
CF₃—O—CHF—CF₂—COOH
CF₃—O—CF₂—CF₂—O—CHF—CF₂—COOH
CF₃—CF₂—O—CHF—CF₂—COOH
CF₃—O—CF₂—CF₂—CF₂—O—CHF—CF₂—COOH
CF₃—O—CF₂—O—CF₂—CF₂—O—CHF—CF₂—COOH
CF₃—(O—CF₂)₂—O—CF₂—CF₂—O—CHF—CF₂—COOH
CF₃—(O—CF₂)₃—O—CF₂—CF₂—O—CHF—CF₂—COOH
CF₃—O—CF₂—CHF—COOH
C₃F₇—O—CF₂—CHF—COOH
CF₃—O—CF₂—CF₂—CF₂—O—CF₂—CHF—COOH
CF₃—O—CF₂—O—CF₂—CF₂—O—CF₂—CHF—COOH
CF₃—(O—CF₂)₂—O—CF₂—CF₂—O—CF₂—CHF—COOH
CF₃—(O—CF₂)₃—O—CF₂—CF₂—O—CF₂—CHF—COOH
CF₃—O—CF₂—CHF—CF₂—COOH
C₂F₅—O—CF₂—CHF—CF₂—COOH
C₃F₇—O—CF₂—CHF—CF₂—COOH
CF₃—O—CF₂—CF₂—CF₂—O—CF₂—CHF—CF₂—COOH
CF₃—O—CF₂—O—CF₂—CF₂—O—CF₂—CHF—CF₂—COOH
CF₃—(O—CF₂)₂—O—CF₂—CF₂—O—CF₂—CHF—CF₂—COOH
CF₃—(O—CF₂)₃—O—CF₂—CF₂—O—CF₂—CHF—CF₂—COOH
CF₃—O—CHF—CF₂—O—CH₂—COOH
CF₃—O—CF₂—CF₂—CF₂—O—CHF—CF₂—O—CH₂—COOH
C₃F₇—O—CHF—CF₂—O—CH₂—COOH
C₃F₇—O—CHF—CF₂—O—CH₂—CH₂—COOH
C₃F₇—O—CF₂—CF₂—O—CHF—CF₂—OCH₂COOH
C₃F₇—O—CF₂—CF₂—CF₂—O—CHF—CF₂—OCH₂COOH
C₃F₇—O—CF₂—CHF—CF₂—OCH₂COOH
CF₃—CHF—CF₂—O—CH₂COOH
C₃F₇—CF₂—CHF—CF₂—OCH₂—COOH
CF₃—O—CF₂—CF₂—O—CH₂—COOH
CF₃—O—CF₂—CF₂—CF₂—O—CF₂—CF₂—O—CH₂—COOH
C₃F₇—O—CF₂—CF₂—O—CH₂—COOH
C₃F₇—O—CF₂—CF₂—O—CH₂—CH₂—COOH
C₃F₇—O—CF₂—CF₂—O—CF₂—CF₂—OCH₂COOH
C₃F₇—O—CF₂—CF₂—CF₂—O—CF₂—CF₂—OCH₂COOH
C₃F₇—O—CF₂—CF₂—CF₂—OCH₂COOH
C₄F₉—O—CH₂—COOH
C₄F₉—O—CH₂—CH₂—COOH
C₃F₇—O—CH₂COOH
C₆F₁₃—OCH₂—COOH and salts of any of these fluorinated carboxylic acids.

16. Coating composition according to claim 1 wherein said non-fluorinated non-ionic surfactant corresponds to the formula:

$$R^1—O—[CH_2CH_2O]_n—[R^2O]_m—R^3 \qquad (XV)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2.

17. Coating composition according to claim 1 wherein said non-fluorinated non-ionic surfactant is contained in said coating composition in an amount of 0.5 to 15% by weight based on the total weight of fluoropolymer particles in the coating composition.

18. Coating composition according to claim 1 wherein said fluoropolymer particles comprise core-shell particles of a non-melt processable polymer of tetrafluoroethylene wherein the shell comprises a copolymer of tetrafluoroethylene and a partially fluorinated or non-fluorinated comonomer.

19. Coating composition according to claim 1 further comprising a melt-processable fluoropolymer.

20. Coating composition according to claim 1 wherein said non-fluorinated polymer is selected from the group consisting of silicone resins, polysulfones, polyamides including aliphatic and alicyclic polyamides, polyamide acids including salts thereof, polyamide acid amides and polyamide-imides; polyimides including polybismaleimides, acrylic polymers, methacrylic polymers, polysulfides including polyarylene sulfides such as polyphenylene sulfides, alkyd resins, polyvinyl chlorides, polybutadienes, nitrocelluloses, urea-formaldehyde resins, polyurethanes, polycarbonates and vinyl cyclic acetals and mixtures thereof.

21. Method of coating a substrate comprising the coating of a coating composition as defined in any of claim 1.

22. Method according to claim 21 wherein said substrate is a metal substrate selected from aluminium and steel.

23. Substrate comprising a coating obtained with the method of claim 21.

* * * * *

UNITED STATES PATENT AND TRADEMARK OFFICE
CERTIFICATE OF CORRECTION

PATENT NO. : 7,754,795 B2  Page 1 of 1
APPLICATION NO. : 11/420431
DATED : July 13, 2010
INVENTOR(S) : Klaus Hintzer It is certified that error appears in the above-identified patent and that said Letters Patent is hereby corrected as shown below:

ON THE TITLE PAGE:

Column 2 (Other Publications)
Line 1, delete "Furification" and insert in place thereof -- Purification --.

Page 3, Column 2 (Other Publications)
Line 28, delete "Liberary," and insert in place thereof -- Library --.

IN THE CLAIMS:

Column 28
Line 12 (approx.), in Claim 9, after " $R_f^1\!-\![OR_f^2]_p\!-\![OR_f^3]_q$ " insert -- – --.

Signed and Sealed this

Seventh Day of December, 2010

David J. Kappos
*Director of the United States Patent and Trademark Office*